US010093165B2

(12) United States Patent
Imamura et al.

(10) Patent No.: US 10,093,165 B2
(45) Date of Patent: Oct. 9, 2018

(54) CONTROL DEVICE OF VEHICLE

(71) Applicant: TOYOTA JIDOSHA KABUSHIKI KAISHA, Toyota-shi, Aichi (JP)

(72) Inventors: Tatsuya Imamura, Okazaki (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/643,875

(22) Filed: Jul. 7, 2017

(65) Prior Publication Data
US 2018/0022204 A1    Jan. 25, 2018

(30) Foreign Application Priority Data

Jul. 19, 2016  (JP) ................................ 2016-141922

(51) Int. Cl.
*B60K 6/387*  (2007.10)
*B60K 6/445*  (2007.10)
(Continued)

(52) U.S. Cl.
CPC .............. *B60K 6/445* (2013.01); *B60K 6/365* (2013.01); *B60K 6/387* (2013.01); *B60K 6/543* (2013.01);
(Continued)

(58) Field of Classification Search
CPC ........... B60W 10/02; B60W 2710/021; B60W 2510/0208; B60W 2710/023;
(Continued)

(56) References Cited

U.S. PATENT DOCUMENTS 5,562,565 A * 10/1996 Moroto .................... B60K 6/26
                                                          180/65.6
6,176,807 B1 * 1/2001 Oba ....................... B60K 6/365
                                                          180/65.25
(Continued)

FOREIGN PATENT DOCUMENTS

JP    2014-031074 A    2/2014
JP    2015-016782 A    1/2015
(Continued)

OTHER PUBLICATIONS

The U.S. Appl. No. 15/463,591, filed Mar. 20, 2017 in the name of Tatsuya Imamura et al.

*Primary Examiner* — Emma K Frick
(74) *Attorney, Agent, or Firm* — Oliff PLC

(57) ABSTRACT

A control device of a vehicle including a first differential portion, a second differential portion, and a second rotating machine, the first differential portion including a first rotating element, a second rotating element to which a first rotating machine is coupled in a power transmittable manner, and a third rotating element coupled to drive wheels, the first differential portion having a differential state controlled through control of the operational state of the first rotating machine, the second differential portion including a fourth rotating element to which an engine is coupled in a power transmittable manner, a fifth rotating element, and a sixth rotating element to which the first rotating element is coupled, the second rotating machine being coupled to the drive wheels in a power transmittable manner, the vehicle further including at least one engagement device out of a first engagement device and a second engagement device as well as a third engagement device, the first engagement device coupling any two rotating elements out of the fourth rotating element, the fifth rotating element, and the sixth
(Continued)

rotating element, the second engagement device coupling the fifth rotating element to a non-rotatable member, the third engagement device coupling any one rotating element out of the second rotating element and the third rotating element to the fifth rotating element, the control device comprising: an engagement control portion; and a differential rotation suppression control portion, during running of the vehicle in a rotation stop state of the engine, when the engaged state of only the first engagement device or the engaged state of only the second engagement device out of the first engagement device, the second engagement device, and the third engagement device is switched to the engaged state of only the third engagement device, or when the engaged state of only the third engagement device out of the first engagement device, the second engagement device, and the third engagement device is switched to the engaged state of only the first engagement device or the engaged state of only the second engagement device, the engagement control portion configured to put all engagement devices included in the vehicle out of the first engagement device, the second engagement device, and the third engagement device into the released state and, after a differential rotation speed is made equal to or less than a first predetermined value in an engagement-switching engagement device that is an engagement device to be put into the engaged state after the switching, configured to put the engagement-switching engagement device into the engaged state, and the differential rotation suppression control portion configured to control the operation of the first rotating machine so as to make the differential rotation speed equal to or less than the first predetermined value in the engagement-switching engagement device in the released state of all the engagement devices.

4 Claims, 23 Drawing Sheets

(51) Int. Cl.
| | | |
|---|---|---|
| *B60W 20/14* | (2016.01) | |
| *B60K 6/543* | (2007.10) | |
| *B60W 20/30* | (2016.01) | |
| *B60W 20/40* | (2016.01) | |
| *F16H 3/72* | (2006.01) | |
| *B60K 6/365* | (2007.10) | |
| *B60W 10/06* | (2006.01) | |
| *B60W 10/08* | (2006.01) | |
| *B60W 10/115* | (2012.01) | |
| *F16H 3/78* | (2006.01) | |
| *B60K 6/38* | (2007.10) | |
| *F16H 37/08* | (2006.01) | |

(52) U.S. Cl.
CPC ............ *B60W 10/06* (2013.01); *B60W 10/08* (2013.01); *B60W 10/115* (2013.01); *B60W 20/14* (2016.01); *B60W 20/30* (2013.01); *B60W 20/40* (2013.01); *F16H 3/728* (2013.01); *F16H 3/78* (2013.01); *B60K 2006/381* (2013.01); *F16H 2037/0873* (2013.01)

(58) Field of Classification Search
CPC ....... B60W 2710/02; B60W 2710/028; B60W 2510/02; B60W 2510/021; B60W 2510/028
See application file for complete search history.

(56) References Cited

U.S. PATENT DOCUMENTS

| | | | | |
|---|---|---|---|---|
| 7,086,977 | B2 * | 8/2006 | Supina | B60K 6/365 475/207 |
| 8,961,343 | B2 * | 2/2015 | Tamai | B60K 6/365 475/311 |
| 9,216,641 | B2 * | 12/2015 | Ono | B60K 6/365 |
| 9,221,327 | B2 * | 12/2015 | Ono | B60K 6/365 |
| 9,551,400 | B2 * | 1/2017 | Hiasa | B60K 6/365 |
| 2015/0021110 | A1 | 1/2015 | Ono et al. | |
| 2015/0183422 | A1 * | 7/2015 | Imamura | B60K 6/445 477/3 |
| 2015/0183423 | A1 * | 7/2015 | Yamamoto | B60K 6/387 477/3 |
| 2015/0203104 | A1 | 7/2015 | Haneda et al. | |
| 2015/0322872 | A1 * | 11/2015 | Matsubara | B60K 6/445 701/22 |

FOREIGN PATENT DOCUMENTS

| | | |
|---|---|---|
| JP | 2015-077847 A | 4/2015 |
| WO | 2013/114594 A1 | 8/2013 |

* cited by examiner

FIG.2

| RUNNING MODE | | | | C1 | B1 | CR | MG1 | MG2 |
|---|---|---|---|---|---|---|---|---|
| EV RUNNING | SINGLE DRIVE | | | △ | | | | M |
| | | COMBINATION WITH ENGINE BRAKE | | ○ | ○ | △ | G | M |
| | DOUBLE DRIVE | | | ○ | | | M | M |
| HV(ENG) RUNNING | O/D INPUT SPLIT | FORWARD | ENGINE REVERSE ROTATION INPUT | ○ | ○ | | G | M |
| | | BACKWARD | ENGINE NORMAL ROTATION INPUT | ○ | | | G | M |
| | U/D INPUT SPLIT | FORWARD | ENGINE NORMAL ROTATION INPUT | | | ○ | G | M |
| | | BACKWARD | DIRECT COUPLING | ○ | | ○ | G | M |
| | FIXED STAGE | FORWARD | OUTPUT SHAFT FIXATION | | ○ | ○ | G | |

○: ENGAGED  △: EITHER OR BOTH ENGAGED DURING COMBINATION WITH ENGINE BRAKING  BLANK: RELEASED
G: MAINLY AS GENERATOR  M: MAINLY AS MOTOR ALTHOUGH GENERATOR DURING REGENERATION

FIG.22

| RUNNING MODE | | | C1 | B1 | CR | MG1 | MG2 |
|---|---|---|---|---|---|---|---|
| EV RUNNING | SINGLE DRIVE | | △ | | △ | | M |
| | | COMBINATION WITH ENGINE BRAKE | ○ | | | G | M |
| | DOUBLE DRIVE | | | ○ | | M | M |
| HV(ENG) RUNNING | O/D INPUT SPLIT | FORWARD ENGINE NORMAL ROTATION INPUT | ○ | | | G | M |
| | | BACKWARD ENGINE REVERSE ROTATION INPUT | | ○ | ○ | G | M |
| | U/D INPUT SPLIT | FORWARD ENGINE NORMAL ROTATION INPUT | ○ | | ○ | G | M |
| | | BACKWARD DIRECT COUPLING | | | ○ | G | M |
| | FIXED STAGE | FORWARD OUTPUT SHAFT FIXATION | | ○ | ○ | G | |

○: ENGAGED  △: EITHER OR BOTH ENGAGED DURING COMBINATION WITH ENGINE BRAKING  BLANK: RELEASED
G: MAINLY AS GENERATOR  M: MAINLY AS MOTOR ALTHOUGH GENERATOR DURING REGENERATION

CONTROL DEVICE OF VEHICLE

INCORPORATION BY REFERENCE

The disclosure of Japanese Patent Application No. 2016-141922 filed on Jul. 19, 2016 including the specification, drawings and abstract is incorporated herein by reference in its entirety.

TECHNICAL FIELD

The present invention relates to a control device of a vehicle including a first differential portion having a differential state controlled through control of an operational state of a first rotating machine, a second differential portion to which an engine is coupled in a power transmittable manner, and a second rotating machine coupled to drive wheels in a power transmittable manner.

BACKGROUND ART

A vehicle is well known that includes: a first differential portion having a first rotating element, a second rotating element to which a first rotating machine is coupled in a power transmittable manner, and a third rotating element coupled to drive wheels and having a differential state controlled through control of the operational state of the first rotating machine; a second differential portion having a fourth rotating element to which an engine is coupled in a power transmittable manner, a fifth rotating element, and a sixth rotating element coupled to the first rotating element; and a second rotating machine coupled to the drive wheels in a power transmittable manner. For example, this corresponds to a vehicle described in Patent Document 1. In Patent Document 1, it is disclosed that a first engagement device coupling the fourth rotating element and the fifth rotating element and a second engagement device coupling the fifth rotating element to a non-rotatable member are included, that by controlling operating states (states such as engagement and release) of the first engagement device and the second engagement device, the second differential portion is switched between two stages of high and low, that the power of the engine is transmitted through the second differential portion to the first differential portion, and that the first differential portion is operated as an electric continuously variable transmission.

PRIOR ART DOCUMENT

Patent Document

Patent Document 1: WO 2013/114594 A1

SUMMARY OF THE INVENTION

Problem to be Solved by the Invention

To configure an electric continuously variable transmission operating at a power split ratio different from a power split ratio in the first differential portion, it is conceivable that a third engagement device is further included for coupling either the second rotating element or the third rotating element to the fifth rotating element. In the first differential portion and the second differential portion, when the first rotating element and the sixth rotating element are coupled to each other and, additionally, either the second rotating element or the third rotating element and the fifth rotating element are coupled to each other by releasing the first engagement device, releasing the second engagement device, and engaging the third engagement device, the whole of the first differential portion and the second differential portion can be allowed to act as an electric continuously variable transmission operating at a power split ratio different from the power split ratio in the first differential portion in the case of engaging the first engagement device, releasing the second engagement device, and releasing the third engagement device. At the time of switching of the respective operating states of the first engagement device, the second engagement device, and the third engagement device, when a differential rotation speed is larger in an engagement-switching engagement device that is the engagement device to be put into the engaged state after switching, an engagement shock may become larger and deteriorate the drivability. Particularly, during running in an engine rotation stop state in which a power transmission device including the first differential portion and the second differential portion cannot be operated as the electric continuously variable transmission, the possibility of switching to the engaged state at a high differential rotation speed in the engagement-switching engagement device becomes higher at the time of switching of the respective operating states of the first engagement device, the second engagement device, and the third engagement device.

The present invention was conceived in view of the situations and it is therefore an object of the present invention to provide a control device of a vehicle capable of suppressing an engagement shock at the time of switching of the respective operating states of the first engagement device or the second engagement device and the third engagement device during running in an engine rotation stop state.

Solution to Problem

A first aspect of the present invention provides a control device of a vehicle including (a) a first differential portion, a second differential portion, and a second rotating machine, the first differential portion including a first rotating element, a second rotating element to which a first rotating machine is coupled in a power transmittable manner, and a third rotating element coupled to drive wheels, the first differential portion having a differential state controlled through control of the operational state of the first rotating machine, the second differential portion including a fourth rotating element to which an engine is coupled in a power transmittable manner, a fifth rotating element, and a sixth rotating element to which the first rotating element is coupled, the second rotating machine being coupled to the drive wheels in a power transmittable manner, (b) the vehicle further including at least one engagement device out of a first engagement device and a second engagement device as well as a third engagement device, the first engagement device coupling any two rotating elements out of the fourth rotating element, the fifth rotating element, and the sixth rotating element, the second engagement device coupling the fifth rotating element to a non-rotatable member, the third engagement device coupling any one rotating element out of the second rotating element and the third rotating element to the fifth rotating element, the control device comprising: (c) an engagement control portion; and (d) a differential rotation suppression control portion, wherein during running in a rotation stop state of the engine, when the engaged state of only the first engagement device or the engaged state of only the second engagement device out of the first engagement device, the second engagement device, and the third engagement device is switched to the engaged state of only the third engagement device, or when the engaged state of only the third engagement device out of the first engagement device, the second engagement device, and the third engagement device is switched to the engaged state of only the first engagement device or the engaged state of only the second engagement device, the engagement control portion puts all engagement devices included in the vehicle out of the first engagement device, the second engagement device, and the third engagement device into the released state and, after a differential rotation speed is made equal to or less than a first predetermined value in an engagement-switching engagement device that is an engagement device to be put into the engaged state after the switching, puts the engagement-switching engagement device into the engaged state, and wherein the differential rotation suppression control portion controls the operation of the first rotating machine so as to make the differential rotation speed equal to or less than the first predetermined value in the engagement-switching engagement device in the released state of all the engagement devices.

A second aspect of the present invention provides the control device of a vehicle recited in the first aspect of the present invention, further comprising a start control portion, if a start of the engine is requested during control of the first rotating machine by the differential rotation suppression control portion making the differential rotation speed equal to or less than the first predetermined value, initiating the start of the engine after completion of control of reducing the differential rotation speed by the differential rotation suppression control portion and control of putting the engagement-switching engagement device into the engaged state by the engagement control portion.

A third aspect of the present invention provides the control device of a vehicle recited in the second aspect of the present invention, wherein if a start of the engine is requested during control of the first rotating machine by the differential rotation suppression control portion making the differential rotation speed equal to or less than the first predetermined value, the engagement control portion puts the engagement-switching engagement device into the engaged state after the differential rotation speed is made equal to or less than a second predetermined value higher than the first predetermined value.

A fourth aspect of the present invention provides the control device of a vehicle recited in any one of the first to third aspects of the present invention, wherein the differential rotation suppression control portion controls the operation of the first rotating machine so as to make the differential rotation speed equal to or less than the first predetermined value in the engagement-switching engagement device even during transition while the engagement-switching engagement device is put into the engaged state by the engagement control portion.

Advantageous Effects of the Invention

According to the first aspect of the present invention, when the respective operating states of the first engagement device or the second engagement device and the third engagement device are switched, the operation of the first rotating machine is controlled so as to make the differential rotation speed in the engagement-switching engagement device equal to or less than the first predetermined value while all these engagement devices are in the released state and, therefore, the differential rotation speed in the engagement-switching engagement device may be made smaller by the operation of the first rotating machine while the engine is kept in the rotation stop state. Since the engagement-switching engagement device is engaged after the differential rotation speed is reduced, the engagement shock can be suppressed when the respective operating states of the first engagement device or the second engagement device and the third engagement device are switched during the running in the rotation stop state of the engine.

According to the second aspect of the present invention, if a start of the engine is requested during control of making the differential rotation speed in the engagement-switching engagement device equal to or less than the first predetermined value and the control of reducing the differential rotation speed is interrupted to initiate the engine start (i.e., if the engagement-switching engagement device is engaged to initiate the engine start while the differential rotation speed in the engagement-switching engagement device is still high), the engagement shock tends to increase; however, the engine start is delayed until completion of both the control of reducing the differential rotation speed and the control of putting the engagement-switching engagement device into the engaged state, and the start of the engine is initiated after the completion of these controls, an increase in the engagement shock can be thus avoided.

According to the third aspect of the present invention, if the start of the engine is requested during the control of making the differential rotation speed in the engagement-switching engagement device equal to or less than the first predetermined value, the engagement-switching engagement device is put into the engaged state after the differential rotation speed is made equal to or less than the second predetermined value (>the first predetermined value) and, therefore, as compared to the case of putting the engagement-switching engagement device into the engaged state after the differential rotation speed is made equal to or less than the first predetermined value, the start of the engine is advanced although the engagement shock is slightly increased. Therefore, both the engine start delay and the engagement shock can be suppressed.

According to the fourth aspect of the present invention, even after the differential rotation speed in the engagement-switching engagement device is once made equal to or less than the first predetermined value, the differential rotation speed may change in accordance with a change in the vehicle speed etc. during transition while the engagement-switching engagement device is switched to the engaged state. However, since the operation of the first rotating machine is controlled so as to make the differential rotation speed equal to or less than the first predetermined value even during transition while the engagement-switching engagement device is put into the engaged state, the differential rotation speed can be restrained from increasing so that an increase in engagement shock can be avoided.

BRIEF DESCRIPTION OF DRAWINGS

FIG. 2 is a chart of operating states of engagement devices in running modes.

FIG. 22 is a chart of operating states of engagement devices in running modes of the vehicle shown in FIG. 21.

MODES FOR CARRYING OUT THE INVENTION

Preferably, the first predetermined value is a predefined threshold value for determining whether input/output rotation speeds of the engagement-switching engagement device in the released state are synchronized. As a result, the engagement-switching engagement device is switched to the engaged state when the differential rotation speed in the engagement-switching engagement device is zero or substantially zero, so that the engagement shock can be avoided or substantially avoided.

Preferably, during transition while the operation of the first rotating machine is controlled by the differential rotation suppression control portion so as to make the differential rotation speed in the engagement-switching engagement device equal to or less than a first predetermined value, the engagement control portion provides preparatory control for switching the engagement-switching engagement device to the engaged state. As a result, by providing the preparatory control for switching the engagement-switching engagement device to the engaged state in parallel with the control for reducing the differential rotation speed, a response delay due to an engagement delay of the engagement-switching engagement device can be suppressed at the time of switching of the respective operating states of the first engagement device or the second engagement device and the third engagement device.

Preferably, the control device of the vehicle further includes a torque compensation control portion that outputs a torque from the second rotating machine so as to suppress variation in output torque at the drive wheels during transition while the operation of the first rotating machine is controlled by the differential rotation suppression control portion so as to make the differential rotation speed in the engagement-switching engagement device equal to or less than a first predetermined value. As a result, although a variation possibly occurs in the output torque at the drive wheels because of a rotating element acting as a reaction force element other than the first rotating machine due to a drag and an inertia torque at the time of control of reducing the differential rotation speed, the torque is output from the second rotating machine such that the variation in the output torque is suppressed and, therefore, such a variation in the output torque is more easily canceled.

Examples of the present invention will now be described in detail with reference to the drawings.

Example 1

Figure 1:
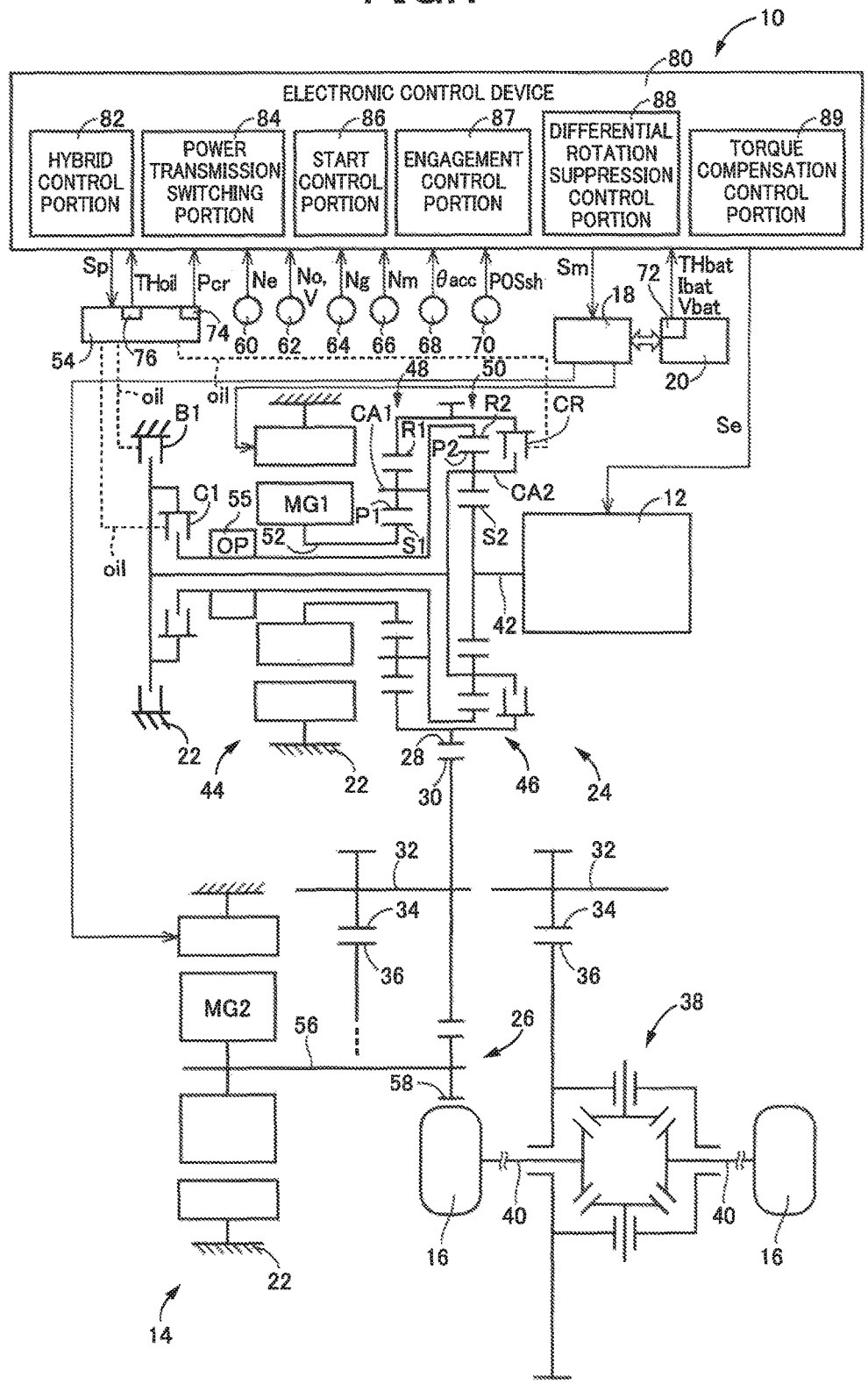
FIG. 1 is a diagram for explaining a general configuration of portions related to running of a vehicle to which the present invention is applied, and is also a diagram for explaining a main portion of a control system for controlling the portions.

FIG. 1 is a diagram for explaining a general configuration of portions related to running of a vehicle 10 to which the present invention is applied, and is also a diagram for explaining a main portion of a control system for controlling the portions. In FIG. 1, the vehicle 10 is a hybrid vehicle including an engine (ENG) 12, a first rotating machine MG1, and a second rotating machine MG2 that may serve as drive power sources for running, as well as a power transmission device 14 having the first rotating machine MG1 and the second rotating machine MG2, and drive wheels 16.

The engine 12 is a known internal combustion engine combusting a predetermined fuel, for example, a gasoline engine or a diesel engine, to output power. In the engine 12, an engine torque Te is controlled through control of an operational state of the engine 12 such as a throttle opening degree or an intake air amount, a fuel supply amount, and an ignition timing by an electronic control device 80 described later.

The first rotating machine MG1 and the second rotating machine MG2 are so-called motor generators having a function of an electric motor (motor) generating a drive torque and a function of an electric generator (generator). The first rotating machine MG1 and the second rotating machine MG2 are both connected through an electric power control unit 18 having an inverter portion, a smoothing capacitor, etc. to a battery unit 20 acting as a power storage device giving and receiving electric power, and the electric power control unit 18 is controlled by the electronic control device 80 described later so as to control an MG1 torque Tg and an MG2 torque Tm that are respective output torques (power running torques or regenerative torques) of the first rotating machine MG1 and the second rotating machine MG2.

The power transmission device 14 is disposed on a power transmission path between the engine 12 and the drive wheels 16. The power transmission device 14 includes, in a case 22 that is a non-rotatable member attached to a vehicle body, a first power transmission portion 24, a second power transmission portion 26, a driven gear 30 meshing with a drive gear 28 that is an output rotating member of the first power transmission portion 24, a driven shaft 32 fixing the driven gear 30 in a relatively non-rotatable manner, a final gear 34 (the final gear 34 having a smaller diameter than the driven gear 30) fixed to the driven shaft 32 in a relatively non-rotatable manner, a differential gear 38 meshing with the final gear 34 via a differential ring gear 36, etc. The power transmission device 14 includes axles 40 etc. coupled to the differential gear 38.

The first power transmission portion 24 is disposed coaxially with an input shaft 42 that is an input rotating member of the first power transmission portion 24 and includes a first differential portion 44, a second differential portion 46, and a clutch CR. The first differential portion 44 includes a first planetary gear mechanism 48 and the first rotating machine MG1. The second differential portion 46 includes a second planetary gear mechanism 50, a clutch C1, and a brake B1.

The first planetary gear mechanism 48 is a known single pinion type planetary gear mechanism having a first sun gear S1, a first pinion gear P1, a first carrier CA1 supporting the first pinion gear P1 such that the first pinion gear P1 is rotatable about its axis and an axis of the first planetary gear mechanism, and a first ring gear R1 meshing via the first pinion gear P with the first sun gear S1, and functions as a differential mechanism generating a differential action. The second planetary gear mechanism 50 is a known single pinion type planetary gear mechanism having a second sun gear S2, a second pinion gear P2, a second carrier CA2 supporting the second pinion gear P2 such that the second pinion gear P2 is rotatable about its axis and an axis of the second planetary gear mechanism, and a second ring gear R2 meshing via the second pinion gear P2 with the second sun gear S2, and functions as a differential mechanism generating a differential action.

The first carrier CA1 is a first rotating element RE1 acting as an input element coupled to an output rotating member of the second differential portion 46 (i.e., the second ring gear R2 of the second planetary gear mechanism 50) and functions as an input rotating member of the first differential portion 44. The first sun gear S1 is integrally coupled to a rotor shaft 52 of the first rotating machine MG1 and is a second rotating element RE2 acting as a reaction force element to which the first rotating machine MG1 is coupled in a power transmittable manner. The first ring gear R1 is integrally coupled to the drive gear 28, is a third rotating element RE3 acting as an output element coupled to the drive wheels 16, and functions as an output rotating member of the first differential portion 44.

The second sun gear S2 is a fourth rotating element RE4 integrally coupled to the input shaft 42 and coupled via the input shaft 42 to the engine 12 in a power transmittable manner and functions as an input rotating member of the second differential portion 46. The second carrier CA2 is a fifth rotating element RE5 selectively coupled via the brake B1 to the case 22. The second ring gear R2 is a sixth rotating element RE6 coupled to the input rotating member of the first differential portion 44 (i.e., the first carrier CA1 of the first planetary gear mechanism 48) and functions as the output rotating member of the second differential portion 46. The second carrier CA2 and the second ring gear R2 are selectively coupled to each other via the clutch C1. The first ring gear R1 and the second carrier CA2 are selectively coupled to each other via the clutch CR. Therefore, the clutch C is a first engagement device selectively coupling the fifth rotating element RE5 and the sixth rotating element RE6 to each other. The brake B1 is a second engagement device selectively coupling the fifth rotating element RE5 to the case 22 that is the non-rotatable member. The clutch CR is a third engagement device selectively coupling the third rotating element RE3 and the fifth rotating element RE5 to each other.

Preferably, the clutch C1, the brake B1, and the clutch CR are all wet type friction engagement devices and are multiplate hydraulic friction engagement devices to which engagement control is provided by hydraulic actuators. The clutch C1, the brake B1, and the clutch CR have operating states (states such as engagement and release) controlled through the control of a hydraulic control circuit 54 included in the vehicle 10 by the electronic control device 80 described later, in accordance with hydraulic pressures (e.g., a C1 hydraulic pressure Pc1, a B1 hydraulic pressure Pb1, and a CR hydraulic pressure Pcr) respectively supplied from the hydraulic control circuit 54. The vehicle 10 includes a mechanical oil pump 55 (also referred to as OP 55), and the OP 55 supplies the power transmission device 14 with a hydraulic fluid (oil) oil used for switching of the respective operating states of the clutch C1, the brake B1, and the clutch CR, lubrication of the portions, and cooling of the portions. The OP 55 is coupled to any of the rotating members (having the same meaning as the rotating elements) of the power transmission device 14 and is driven in accordance with the rotation of the rotating member. In this example, the OP 55 is coupled to the first rotating element RE1 (having the same meaning as the sixth rotating element RE6 in this example). If it is necessary to supply the hydraulic fluid oil during stop of rotation of the rotating member to which the OP 55 is coupled, an electric oil pump is included in addition to the OP 55, for example. Alternatively, an electric oil pump may be included instead of the OP 55.

In a state in which a differential motion is permitted, the first planetary gear mechanism 48 can function as a power division mechanism dividing (having the same meaning as distributing) the power of the engine 12 input to the first carrier CA1 between the first rotating machine MG1 and the first ring gear R1. Therefore, by taking the reaction force of the engine torque Te input to the first carrier CA1 by the first rotating machine MG1, the vehicle 10 can perform the engine running with a direct torque (also referred to as an engine direct torque) mechanically transmitted to the first ring gear R1 and an MG2 torque Tm from the second rotating machine MG2 driven by an electric power generated by the first rotating machine MG1 from the power divided for the first rotating machine MG1. Therefore, the first differential portion 44 functions as a known electric differential portion (electric continuously variable transmission) controlling a gear ratio (speed change ratio) in accordance with control of an operational state of the first rotating machine MG1 through control of the electric power control unit 18 by the electronic control device 80 described later. Thus, the first differential portion 44 is an electric transmission mechanism in which the differential state of the first planetary gear mechanism 48 is controlled through control of the operational state of the first rotating machine MG1.

By switching the operating states of the clutch C1 and the brake B1, the second differential portion 46 can form four states, which are a direct coupling state, a reverse-rotation speed change state of the engine 12, a neutral state, and an internal lock state. Specifically, while the clutch C1 is in the engaged state, the second differential portion 46 is put into the direct coupling state in which the rotating elements of the second planetary gear mechanism 50 are integrally rotated. While the brake B1 is in the engaged state, the second differential portion 46 is put into the reverse-rotation speed change state of the engine 12 in which the second ring gear R2 (the output rotating member of the second differential portion 46) rotates negatively with respect to positive rotation of an engine rotation speed Ne. While the clutch C1 is in the released state and the brake B1 is in the released state, the second differential portion 46 is put into the neutral state in which the differential motion of the second planetary gear mechanism 50 is permitted. While the clutch C1 is in the engaged state and the brake B1 is in the engaged state, the second differential portion 46 is put into the internal lock state in which the rotating elements of the second planetary gear mechanism 50 stop rotating.

The first power transmission portion 24 can constitute an electric continuously variable transmission operating at a power split ratio different from a power split ratio of the first differential portion 44. In particular, when the first carrier CA1 (the first rotating element RE1) and the second ring gear R2 (the sixth rotating element RE6) are coupled and, additionally, the first ring gear R1 (the third rotating element RE3) and the second carrier CA2 (the fifth rotating element RE5) are coupled by putting the clutch CR into the engaged state, the first power transmission portion 24 can allow the first differential portion 44 and the second differential portion 46 to constitute one differential mechanism and can cause the whole of the first differential portion 44 and the second differential portion 46 to function as the electric continuously variable transmission operating at a power split ratio different from the power split ratio of the first differential portion 44 alone.

The second differential portion 46 forming the four states described above and the first differential portion 44 are coupled in the first power transmission portion 24, and the vehicle 10 can achieve a plurality of running modes described later in combination with switching of the operating state of the clutch CR.

In the first power transmission portion 24 configured as described above, the power of the engine 12 and the power of the first rotating machine MG1 are transmitted from the drive gear 28 to the driven gear 30. Therefore, the engine 12 and the first rotating machine MG1 are coupled via the first power transmission portion 24 to the drive wheels 16 in a power transmittable manner.

The second power transmission portion 26 includes the second rotating machine MG2, a rotor shaft 56 of the second rotating machine MG2 disposed separately from the input shaft 42 and parallel to the input shaft 42, and a reduction gear 58 (the reduction gear 58 having a smaller diameter than the driven gear 30) meshing with the driven gear 30 and coupled to the rotor shaft 56. As a result, in the second power transmission portion 26, the power of the second rotating machine MG2 is transmitted to the driven gear 30 without via the first power transmission portion 24. Therefore, the second rotating machine MG2 is coupled to the drive wheels 16 in a power transmittable manner without via the first power transmission portion 24. In other words, the second rotating machine MG2 is a rotating machine coupled to the axles 40 serving as the output rotating member of the power transmission device 14 in a power transmittable manner without via the first power transmission portion 24. In addition to the axles 40, the final gear 34 and the differential ring gear 36 have the same meaning as the output rotating member of the power transmission device 14.

The power transmission device 14 configured as described above is preferably used for an FF (front-engine front-drive) type vehicle. In the power transmission device 14, the power of the engine 12, the power of the first rotating machine MG1, and the power of the second rotating machine MG2 are transmitted to the driven gear 30, and are transmitted from the driven gear 30, sequentially through the final gear 34, the differential gear 38, the axles 40, etc. to the drive wheels 16. The vehicle 10 has the engine 12, the first power transmission portion 24, and the first rotating machine MG1 arranged on an axis different from that of the second rotating machine MG2 so that the axial length is shortened. A gear pair of the driven gear 30 and the reduction gear 58 can make a speed reduction ratio of the second rotating machine MG2 larger.

The vehicle 10 includes the electronic control device 80 including a control device controlling the portions related to running. The electronic control device 80 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 80 provides output control of each of the engine 12, the first rotating machine MG1, and the second rotating machine MG2, and switching control of the running modes described later and is configured separately for engine control, rotating machine control, hydraulic control, etc., as needed.

The electronic control device 80 is supplied with various signals (such as the engine rotation speed Ne, an output rotation speed No that is the rotation speed of the drive gear 28 corresponding to a vehicle speed V, an MG1 rotation speed Ng, an MG2 rotation speed Nm, an accelerator opening degree θacc, a shift lever operation position POSsh, a battery temperature THbat, a battery charge/discharge current Ibat, and a battery voltage Vbat of the battery unit 20, the CR hydraulic pressure Pcr, and a hydraulic fluid temperature THoil that is the temperature of the hydraulic fluid oil) based on detection values from various sensors etc. provided on the vehicle 10 (e.g., an engine rotation speed sensor 60, an output rotation speed sensor 62, an MG1 rotation speed sensor 64 such as a resolver, an MG2 rotation speed sensor 66 such as a resolver, an accelerator opening degree sensor 68, a shift position sensor 70, a battery sensor 72, a CR hydraulic pressure sensor 74, and an oil temperature sensor 76). The electronic control device 80 supplies various devices included in the vehicle 10 (e.g., the engine 12, the electric power control unit 18, and the hydraulic control circuit 54) with various command signals (e.g., an engine control command signal Se, a rotating machine control command signal Sm, and a hydraulic control command signal Sp). The electronic control device 80 calculates a state of charge (charging capacity) SOC (hereinafter referred to as a battery capacity SOC) of the battery unit 20 based on the battery charge/discharge current Ibat and the battery voltage Vbat, for example.

The electronic control device 80 includes a hybrid control means, i.e., a hybrid control portion 82, and a power transmission switching means, i.e., a power transmission switching portion 84, so as to achieve a control function for various controls in the vehicle 10.

The hybrid control portion 82 outputs the engine control command signal Se controlling opening/closing of an electronic throttle valve, controlling a fuel injection amount and an injection timing, and controlling the ignition timing, so as to provide the output control of the engine 12 such that a target torque of the engine torque Te is acquired. The hybrid control portion 82 outputs to the electric power control unit 18 the rotating machine control command signal Sm controlling the operations of the first rotating machine MG1 and the second rotating machine MG2 to provide the output control of the first rotating machine MG1 and the second rotating machine MG2 such that target torques of the MG1 torque Tg and the MG2 torque Tm can be acquired.

The hybrid control portion 82 calculates a drive torque (required drive torque) required at a current vehicle speed V from the accelerator opening degree θacc and generates the required drive torque from at least one of the engine 12, the first rotating machine MG1, and the second rotating machine MG2 so as to achieve operation with lower fuel consumption and a smaller exhaust gas amount in consideration of a charging request value (charging request power) etc.

The hybrid control portion 82 selectively establishes a motor running (EV running) mode or a hybrid running (HV running) mode (also referred to as an engine running (ENG running) mode) as a running mode depending on a running state of the vehicle 10. The EV running mode is a control mode enabling the EV running using at least one rotating machine out of the first rotating machine MG1 and the second rotating machine MG2 as a drive power source for running with the operation of the engine 12 stopped. The HV running mode is a control mode enabling the HV running (engine running) using at least the engine 12 as the drive power source for running (i.e., transmitting the power of the engine 12 to the drive wheels 16). It is noted that the HV running mode includes even a mode not premised on running of the vehicle 10 such as a mode of converting the power of the engine 12 into an electric power through the electric generation by the first rotating machine MG1 exclusively for charging the battery unit 20 with the electric power, because the engine 12 is put into an operating state.

The power transmission switching portion 84 controls the respective engagement operations (operating states) of the clutch C1, the brake B1, and the clutch CR based on the running mode established by the hybrid control portion 82. The power transmission switching portion 84 outputs to the hydraulic control circuit 54 the hydraulic control command signal Sp engaging and/or releasing each of the clutch C1, the brake B1, and the clutch CR such that the power can be transmitted for running in the running mode established by the hybrid control portion 82.

The running mode executable in the vehicle 10 will be described with reference to FIGS. 2 and 3 to 10. FIG. 2 is a chart of the operating states of the clutch C1, the brake B1, and the clutch CR in the running modes. Circles and blanks in the chart of FIG. 2 indicate engagement and release, respectively, of the engagement devices (C1, B1, CR), and triangles indicate that either or both of the engagement devices marked with the triangles are engaged at the time of combination with engine braking (also referred to as engine brake) putting the engine 12 in the operation stop state into a corotation state. "G" indicates that the rotating machines (MG1, MG2) are allowed to function mainly as a generator, and "M" indicates that the rotating machines (MG1, MG2) are allowed to function mainly as a motor during driving and allowed to function mainly as a generator during regeneration. As shown in FIG. 2, the vehicle 10 can selectively achieve the EV running mode and the HV running mode as the running mode. The EV running mode includes a single drive EV mode that is a control mode in which the EV running can be performed by using only the second rotating machine MG2 as the single drive power source and a double drive EV mode that is a control mode in which the EV running can be performed by using the first rotating machine MG1 and the second rotating machine MG2 as the drive power source. The HV running mode includes three modes, which are an overdrive (O/D) input split mode (hereinafter referred to as the O/DHV mode), an underdrive (U/D) input split mode (hereinafter referred to as the U/DHV mode), and a fixed stage mode.

FIGS. 3 to 10 are collinear charts capable of relatively representing rotation speeds of the rotating elements RE1 to RE6 in each of the first planetary gear mechanism 48 and the second planetary gear mechanism 50. In these collinear charts, vertical lines Y1 to Y4 indicative of the rotation speeds of the rotating elements are arranged in order from the left on the planes of the figures; the vertical line Y1 indicates the rotation speed of the first sun gear S1 that is the second rotating element RE2 coupled to the first rotating machine MG1; the vertical line Y2 indicates the rotation speeds of the first carrier CA1 that is the first rotating element RE1 and the second ring gear R2 that is the sixth rotating element RE6, which are coupled to each other, the vertical line Y3 indicates the rotation speed of the first ring gear R1 that is the third rotating element RE3 coupled to the drive gear 28 and the rotation speed of the second carrier CA2 that is the fifth rotating element RE5 selectively coupled to the case 22 via the brake B1; and the vertical line Y4 indicates the rotation speed of the second sun gear S2 that is the fourth rotating element RE4 coupled to the engine 12. Arrows at a white square (□), a white circle (○), and a black circle (●) indicate the MG1 torque Tg, the engine torque Te, and the MG2 torque Tm, respectively. When the clutch C1 selectively coupling the second carrier CA2 and the second ring gear R2 has a blank space, this represents the released state of the clutch C1 and, when the clutch C1 has hatching (hatched lines), this represents the engaged state of the clutch C1. For the brake B1 selectively coupling the second carrier CA2 to the case 22, a white diamond shape (◇) indicates the released state of the brake B1 and a black diamond shape (◆) indicates the engaged state of the brake B1. For the clutch CR selectively coupling the first ring gear R1 and the second carrier CA2, a white diamond shape (◇) indicates the released state of the clutch CR and a black diamond shape (◆) indicates the engaged state of the clutch CR. A straight line relatively indicative of the rotation speed related to the first planetary gear mechanism 48 is drawn as a solid line, and a straight line relatively indicative of the rotation speed related to the second planetary gear mechanism 50 is drawn as a broken line. The arrow at the black circle (●) is the MG2 torque Tm from the second rotating machine MG2 driven by the electric power generated by the first rotating machine MG1 from the power of the engine 12 divided to the first rotating machine MG1, so that the engine direct torque is not included. The black diamond shape (◆) of the clutch CR overlaps with the black circle (●) and is therefore not shown in the figures.

Figure 3:
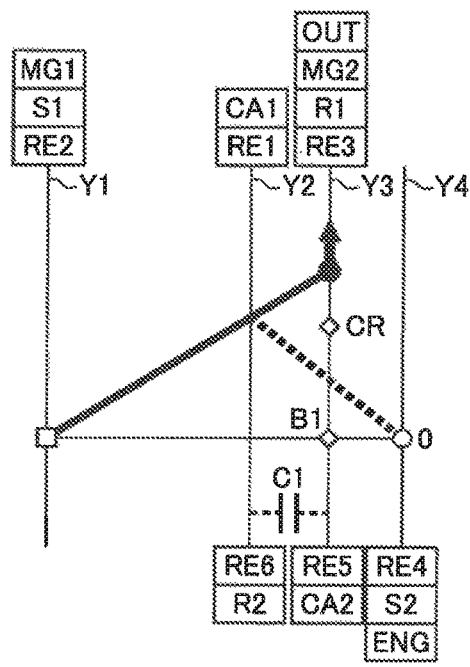
FIG. 3 is a collinear chart at the time of a single drive EV mode.

FIG. 3 is a collinear chart at the time of the single drive EV mode. As shown in FIG. 2, the single drive EV mode is achieved when the clutch C1, the brake B1, and the clutch CR are all in the released state. In the single drive EV mode, the clutch C1 and the brake B1 are released to permit the differential motion of the second planetary gear mechanism 50, and the second differential portion 46 is put into the neutral state. The hybrid control portion 82 stops the operation of the engine 12 and causes the second rotating machine MG2 to output the MG2 torque Tm for running. FIG. 3 shows the case of forward movement of the vehicle 10 when the second rotating machine MG2 outputs a positive torque by positive rotation (i.e., in the rotation direction of the first ring gear R1 at the time of forward movement of the vehicle 10). At the time of backward movement of the vehicle 10, the second rotating machine MG2 is rotated backward with respect to the time of forward movement. During running of the vehicle, the first ring gear R1 coupled to the drive gear 28 is rotated in conjunction with the rotation of the second rotating machine MG2 (having the same meaning as the rotation of the drive wheels 16 in this case). In the single drive EV mode, additionally, since the clutch CR is released, each of the engine 12 and the first rotating machine MG1 is not corotated so that the engine rotation speed Ne and the MG1 rotation speed Ng can be made zero. As a result, a drag loss in each of the engine 12 and the first rotating machine MG1 can be reduced to improve a specific power consumption (i.e., to suppress the electric power consumption). The hybrid control portion 82 maintains the MG1 rotation speed Ng to zero through feedback control. Alternatively, the hybrid control portion 82 provides control (d-axis lock control) of applying a current to the first rotating machine MG1 so as to fix the rotation of the first rotating machine MG1, thereby maintaining the MG1 rotation speed Ng at zero. Alternatively, when the MG1 rotation speed Ng can be maintained at zero by cogging torque of the first rotating machine MG1 even if the MG1 torque Tg is made zero, it is not necessary to add the MG torque Tg. Even if the control of maintaining the MG1 rotation speed Ng at zero is provided, the first power transmission portion 24 is in the neutral state in which the reaction force of the MG1 torque Tg cannot be taken, and therefore does not affect the drive torque. In the single drive EV mode, the first rotating machine MG1 may be allowed to idle with no load.

Since the engine 12 stopped operating is not corotated and is put into the stop state with zero rotation in the single drive EV mode, a regeneration amount can be made larger when the second rotating machine MG2 provides regenerative control during running in the single drive EV mode. If no regenerative energy can be taken because of a fully charged state of the battery unit 20 during running in the single drive EV mode, it is conceivable that engine braking is used in combination. When the engine braking is used in combination, as shown in FIG. 2, the clutch C1 or the clutch CR is engaged (see combination with engine brake in the single drive EV mode). When the clutch C1 or the clutch CR is engaged, the engine 12 is put into the corotation state. In this state, the engine rotation speed Ne can be increased by the first rotating machine MG1 to put the engine braking into action. Even in the corotation state of the engine 12, the engine rotation speed Ne can be made zero and, in this case, the EV running can be performed without putting the engine braking into action. The engine braking can be put into action also by engaging the brake B1.

Figure 4:
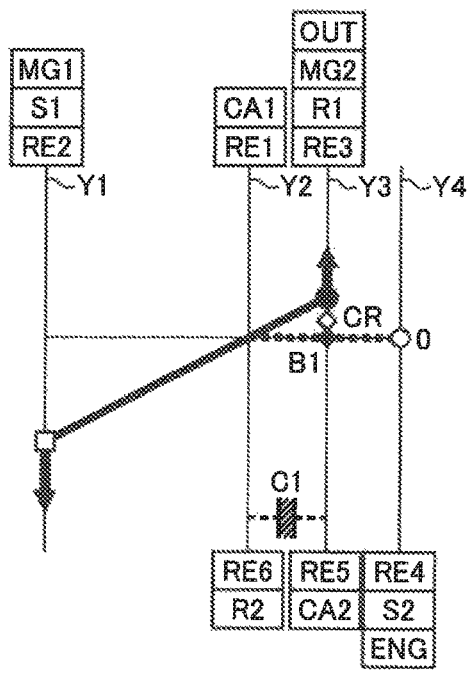
FIG. 4 is a collinear chart at the time of a double drive EV mode.

FIG. 4 is a collinear chart at the time of the double drive EV mode. As shown in FIG. 2, the double drive EV mode is achieved when the clutch C1 and the brake B1 are in the engaged state and the clutch CR is in the released state. In the double drive EV mode, the clutch C1 and the brake B1 are engaged to restrict the differential motion of the second planetary gear mechanism 50, and the rotation of the second carrier CA2 is stopped. Therefore, the rotation of all the rotating elements is stopped in the second planetary gear mechanism 50, and the second differential portion 46 is put into the internal lock state. As a result, the engine 12 is put into the stop state with zero rotation, and the first carrier CA1 coupled to the second ring gear R2 is also fixed at zero rotation. When the first carrier CA1 is fixed in a non-rotatable manner, the reaction torque of the MG1 torque Tg is taken by the first carrier CA1, so that the torque based on the MG1 torque Tg can mechanically be output from the first ring gear R1 and transmitted to the drive wheels 16. The hybrid control portion 82 stops the operation of the engine 12 and causes the first rotating machine MG1 and the second rotating machine MG2 to output the MG1 torque Tg and the MG2 torque Tm, respectively, for running. FIG. 4 shows the case of forward movement when the second rotating machine MG2 outputs a positive torque by positive rotation while the first rotating machine MG1 outputs a negative torque by negative rotation. At the time of backward movement, the first rotating machine MG1 and the second rotating machine MG2 are rotated backward with respect to the time of forward movement.

As described with reference to FIGS. 3 and 4, the vehicle 10 is driven only by the second rotating machine MG2 in the singe drive EV mode, and the vehicle 10 can be driven by the first rotating machine MG1 and the second rotating machine MG2 in the double drive EV mode. Therefore, in the case of the EV running, the singe drive EV mode is established at a low load to perform single running by the second rotating machine MG2, while the double drive EV mode is established at a high load to perform double drive by the first rotating machine MG1 and the second rotating machine MG2. It is noted that the regeneration during vehicle deceleration, including the HV running, is performed mainly by the second rotating machine MG2.

Figure 5:
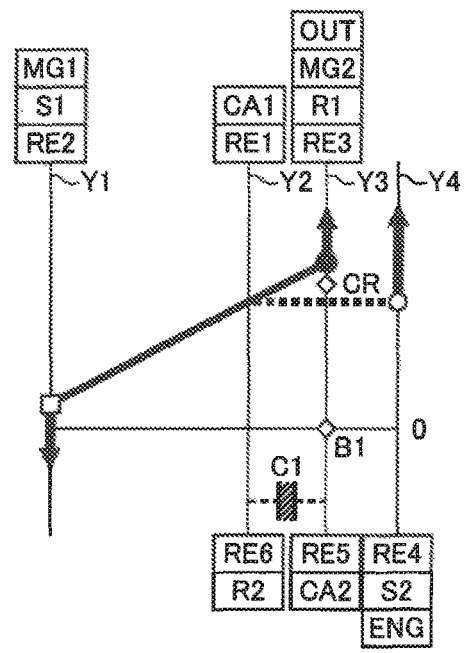
FIG. 5 is a collinear chart in forward running at the time of an O/DHV mode of an HV running mode.

FIG. 5 is a collinear chart in forward running at the time of the O/DHV mode of the HV running mode. As shown in FIG. 2, the forward running in the O/DHV mode (hereinafter referred to as the O/DHV mode (forward)) is achieved when the clutch C1 is in the engaged state and the brake B1 and the clutch CR are in the released state. In the O/DHV mode (forward), since the clutch C1 is engaged and the brake B1 is released so that the second differential portion 46 is put into the direct coupling state, the power of the engine 12 is directly transmitted to the first carrier CA1 coupled to the second ring gear R2. Additionally, in the O/DHV mode (forward), the clutch CR is released, and the electric continuously variable transmission is made up of the first differential portion 44 alone. As a result, the first power transmission portion 24 can divide the power of the engine 12 input to the first carrier CA1 between the first sun gear S1 and the first ring gear R1. Therefore, in the first power transmission portion 24, the reaction force of the engine torque Te input to the first carrier CA1 is taken by the first rotating machine MG1, so that the engine direct torque is mechanically transmitted to the first ring gear R1, and the electric power generated by the first rotating machine MG1 from the power of the engine 12 divided to the first rotating machine MG1 is transmitted through a predetermined electric path to the second rotating machine MG2. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 5 shows the case of forward running when the second rotating machine MG2 outputs a positive torque by positive rotation.

Figure 6:
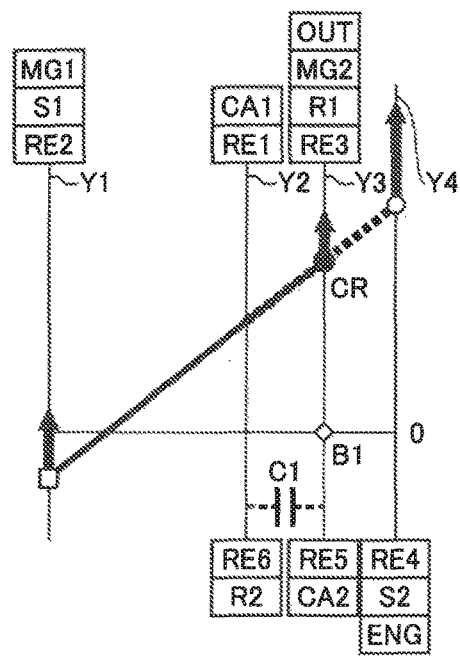
FIG. 6 is a collinear chart in a U/DHV mode of the HV running mode.

FIG. 6 is a collinear chart in the U/DHV mode of the HV running mode. As shown in FIG. 2, the U/DHV mode is achieved when the clutch C1 and the brake B1 are in the released state and the clutch CR is in the engaged state. In the U/DHV mode, the clutch CR is engaged, and one differential mechanism is made up of the first differential portion 44 and the second differential portion 46. Additionally, in the U/DHV mode, the clutch C1 and the brake B1 are released, and the whole of the first differential portion 44 and the second differential portion 46 constitute the electric continuously variable transmission operating at a power split ratio different from the power split ratio of the first differential portion 44 alone. As a result, the first power transmission portion 24 can divide the power of the engine 12 input to the second sun gear S2 between the first sun gear S1 and the first ring gear R1. Therefore, in the first power transmission portion 24, the reaction force of the engine torque Te input to the second sun gear S2 is taken by the first rotating machine MG1, so that the engine direct torque is mechanically transmitted to the first ring gear R1, and the electric power generated by the first rotating machine MG1 from the power of the engine 12 divided to the first rotating machine MG1 is transmitted through a predetermined electric path to the second rotating machine MG2. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 6 shows the case of forward movement when the second rotating machine MG2 outputs a positive torque by positive rotation. At the time of backward movement, the second rotating machine MG2 is rotated backward with respect to the time of forward movement. At the time of the backward movement, engine normal rotation input is performed such that the rotation and the torque of the engine 12 are directly input as positive values to the configuration achieving the function of the electric continuously variable transmission.

Figure 7:
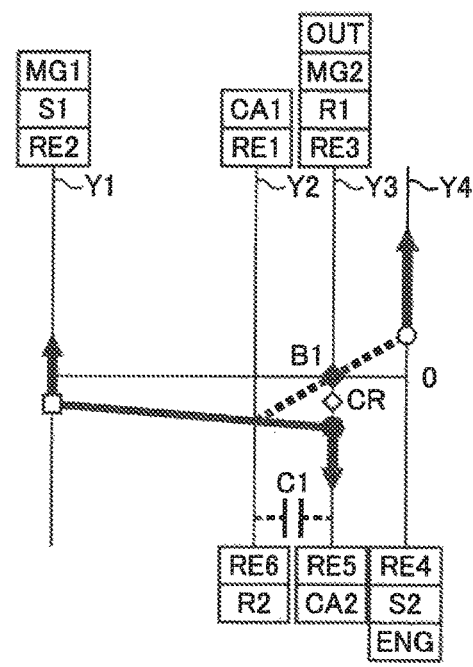
FIG. 7 is a collinear chart in backward running at the time of the O/DHV mode of the HV running mode and shows the case of engine reverse rotation input.

FIG. 7 is a collinear chart in backward running at the time of the O/DHV mode of the HV running mode and shows the case of engine reverse rotation input performed such that the rotation and the torque of the engine 12 are reversed to negative values and input to the configuration achieving the function of the electric continuously variable transmission. As shown in FIG. 2, the backward running in the engine reverse rotation input of the O/DHV mode (hereinafter referred to as the O/DHV mode reverse rotation input (backward)) is achieved when the brake B1 is in the engaged state and the clutch C1 and the clutch CR are in the released state. In the O/DHV mode reverse rotation input (backward), since the clutch C1 is released and the brake B1 is engaged so that the second differential portion 46 is put into the reverse-rotation speed change state of the engine 12, the power of the engine 12 is transmitted to the first carrier CA1 coupled to the second ring gear R2 in negative rotation and as a negative torque. Additionally, in the O/DHV mode reverse rotation input (backward), the clutch CR is released and the electric continuously variable transmission is made up of the first differential portion 44 alone. As a result, the first power transmission portion 24 can divide the power of the engine 12 reversed and input to the first carrier CA1 between the first sun gear S1 and the first ring gear R1. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 7 shows the case of backward running when the second rotating machine MG2 outputs a negative torque by negative rotation.

Figure 8:
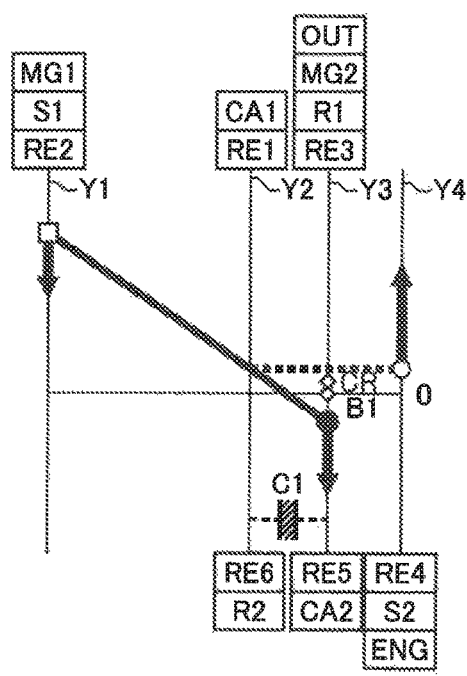
FIG. 8 is a collinear chart in backward running at the time of the O/DHV mode of the HV running mode and shows the case of engine normal rotation input.

FIG. 8 is a collinear chart in backward running at the time of the O/DHV mode of the HV running mode and shows the case of the engine normal rotation input. As shown in FIG. 2, the backward running in the engine normal rotation input of the O/DHV mode (hereinafter referred to as the O/DHV mode normal rotation input (backward)) is achieved when the clutch C1 is in the engaged state and the brake B1 and the clutch CR are in the released state. In the O/DHV mode normal rotation input (backward), since the clutch C is engaged and the brake B1 is released so that the second differential portion 46 is put into the direct coupling state, the power of the engine 12 is directly transmitted to the first carrier CA1 coupled to the second ring gear R2. Additionally, in the O/DHV mode normal rotation input (backward), the clutch CR is released and the electric continuously variable transmission is made up of the first differential portion 44 alone. As a result, the first power transmission portion 24 can divide the power of the engine 12 input to the first carrier CA1 between the first sun gear S1 and the first ring gear R1. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 8 shows the case of backward running when the second rotating machine MG2 outputs a negative torque by negative rotation.

As shown in the description with reference to FIGS. 5 to 8, the O/DHV mode and the U/DHV mode are different in the rotating element when the power of the engine 12 is input to the configuration achieving the function of the electric continuously variable transmission, and is different in the power split ratio when allowing the first power transmission portion 24 to act as the electric continuously variable transmission. Therefore, the ratios of the output torques and the rotation speeds of the rotating machines MG1, MG2 to the engine 12 can be changed between the O/DHV mode and the U/DHV mode. The operating state of the clutch CR is switched so as to change the ratios of the output torques and the rotation speeds of the rotating machines MG1, MG2 to the engine 12 during the engine running.

The engine direct torque in the O/DHV mode (forward) is reduced with respect to the engine torque Te. On the other hand, the engine direct torque in the U/DHV mode is increased with respect to the engine torque Te. In this example, the first differential portion 44 solely constitutes the electric continuously variable transmission in the O/DHV mode (see FIG. 5). Therefore, in the first differential portion 44, when the clutch C1 is in the engaged state and the clutch CR is in the released state so that the differential state is controlled through control of the operational state of the first rotating machine MG1, a torque reduced as compared to the engine torque Te is mechanically transmitted to the first ring gear R1.

In the state of so-called mechanical point in which the MG1 rotation speed Ng is made zero and the power of the engine 12 is entirely mechanically transmitted to the first ring gear R1 without passing through the electric path (the electric power transmission path that is the electric path related to giving/receiving of the electric power of the first rotating machine MG1 and the second rotating machine MG2), the O/DHV mode is the case of the overdrive state in which the rotation of the engine 12 is increased in speed and output from the first ring gear R1, and the U/DHV mode is the case of the underdrive state in which the rotation of the engine 12 is reduced in speed and output from the first ring gear R1.

Figure 9:
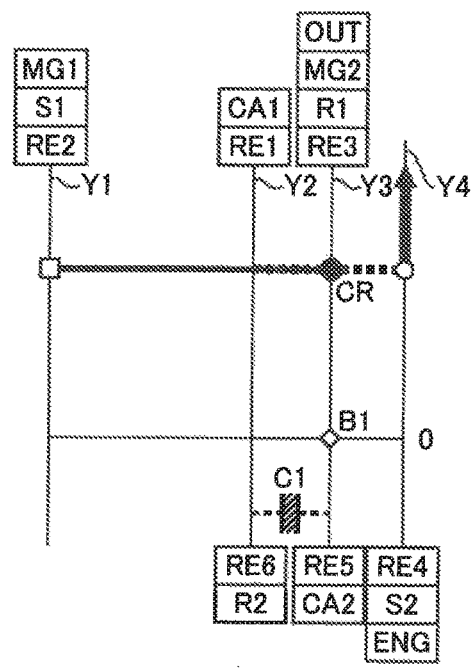
FIG. 9 is a collinear chart at the time of a fixed stage mode of the HV running mode and shows the case of direct coupling when rotating elements of a first differential portion and a second differential portion are integrally rotated.

FIG. 9 is a collinear chart at the time of the fixed stage mode of the HV running mode and shows the case of direct coupling when the rotating elements of the first differential portion 44 and the second differential portion 46 are integrally rotated. As shown in FIG. 2, the direct coupling of the fixed stage mode (hereinafter referred to as the direct coupling fixed stage mode) is achieved when the clutch C1 and the clutch CR are in the engaged state and the brake B1 is in the released state. In the direct coupling fixed stage mode, the clutch C1 is engaged and the brake B1 is released, and the second differential portion 46 is put into the direct coupling state. Additionally, in the direct coupling fixed stage mode, the clutch CR is engaged, and the rotating elements of the first differential portion 44 and the second differential portion 46 are integrally rotated. As a result, the first power transmission portion 24 can output the power of the engine 12 directly from the first ring gear R1. The hybrid control portion 82 causes the engine 12 to output the engine torque Te for running. In this direct coupling fixed stage mode, the first rotating machine MG1 can be driven by the electric power from the battery unit 20 to output the power of the first rotating machine MG1 directly from the first ring gear R1. In this direct coupling fixed stage mode, the second rotating machine MG2 can be driven by the electric power from the battery unit 20 to transmit the power of the second rotating machine MG2 to the drive wheels 16. Therefore, in addition to causing the output of the engine torque Te, the hybrid control portion 82 may cause at least one rotating machine out of the first rotating machine MG1 and the second rotating machine MG2 to output a torque for running. Therefore, in the direct coupling fixed stage mode, the vehicle 10 may be driven only by the engine 12, or torque assist may be performed by the first rotating machine MG1 and/or the second rotating machine MG2.

Figure 10:
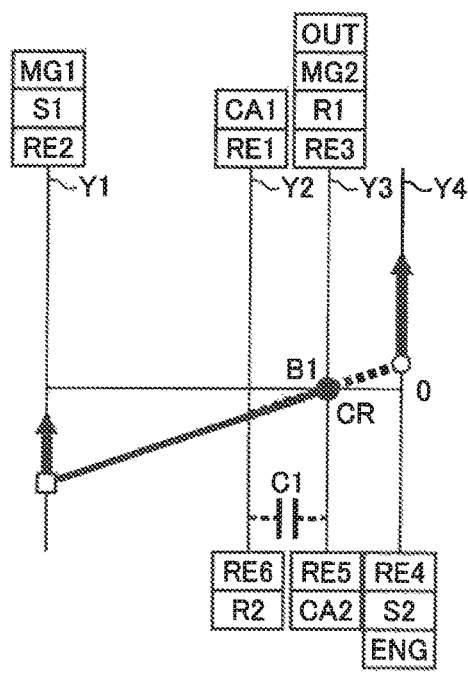
FIG. 10 is a collinear chart at the time of the fixed stage mode of the HV running mode and shows the case of output shaft fixation when a first ring gear is non-rotatably fixed.

FIG. 10 is a collinear chart at the time of the fixed stage mode of the HV running mode and shows the case of output shaft fixation when the first ring gear R1 is non-rotatably fixed. As shown in FIG. 2, the output shaft fixation of the fixed stage mode (hereinafter referred to as the output shaft fixed stage mode) is achieved when the brake B1 and the clutch CR are in the engaged state and the clutch C1 is in the released state. In the output shaft fixed stage mode, the clutch CR is engaged, and the first differential portion 44 and the second differential portion 46 constitute one differential mechanism. Additionally, in the output shaft fixed stage mode, the brake B1 is engaged and the clutch C1 is released, so that the first ring gear R1 is non-rotatably fixed. As a result, in the first power transmission portion 24, the reaction force of the power of the engine 12 input to the second sun gear S2 can be taken by the first rotating machine MG1. Therefore, in the output shaft fixed stage mode, the battery unit 20 can be charged with the electric power generated by the first rotating machine MG1 from the power of the engine 12. The hybrid control portion 82 allows the engine 12 to operate (work) and causes the electric generation of the first rotating machine MG1 to take the reaction force to the power of the engine 12 so as to charge the battery unit 20 through the electric power control unit 18 with the electric power generated by the first rotating machine MG1. Since the first ring gear R1 is non-rotatably fixed, this output shaft fixed stage mode is a mode of exclusively charging the battery unit 20 during stop of the vehicle 10. As shown in the description with reference to FIGS. 9 and 10, the clutch CR is engaged in the direct coupling fixed stage mode and the output shaft fixed stage mode of the HV running mode.

Figure 11:
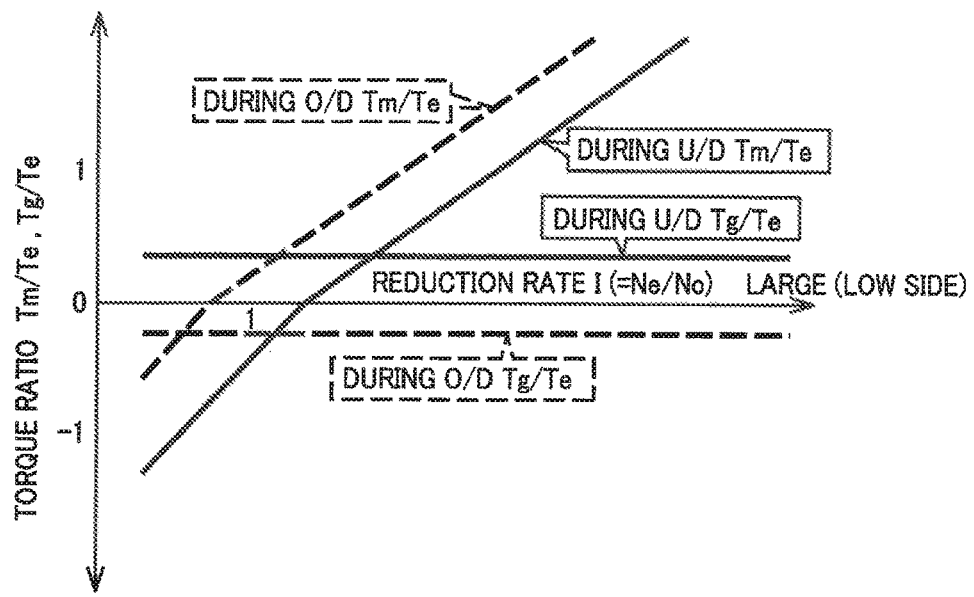
FIG. 11 is a diagram of an example of a torque ratio of an MG1 torque to an engine torque and a torque ratio of an MG2 torque to the engine torque.

FIG. 11 is a diagram of an example of a torque ratio (Tg/Te) of the MG1 torque Tg to the engine torque Te and a torque ratio (Tm/Te) of the MG2 torque Tm to the engine torque Te during the engine running in the forward running. This MG2 torque Tm is the MG2 torque Tm from the second rotating machine MG2 driven by the electric power generated by the first rotating machine MG1 from the power of the engine 12. In FIG. 11, in the region in which a speed reduction ratio I (=Ne/No) of the first power transmission portion 24 is relatively large, the torque ratio (Tm/Te) is made smaller in the U/DHV mode as compared to the O/DHV mode. Therefore, in the region of the relatively large speed reduction ratio I, the U/DHV mode can be established to reduce the burden on the second rotating machine MG2 with respect to the engine torque Te. For example, if the U/DHV mode is established at a high load of the engine 12 using the relatively large speed reduction ratio I, the MG2 torque Tm can be kept low. This means that the U/DHV mode can deal with the larger speed reduction ratio I at the maximum value of the MG2 torque Tm as compared to the O/DHV mode, and that the region of the HV running mode can be expanded. On the other hand, in the region of a relatively small speed reduction ratio I such as less than "1", the absolute value of the torque ratio (Tm/Te) is made larger in the U/DHV mode as compared to the O/DHV mode. When the torque ratio (Tm/Te) is a negative value, this state is a power recirculation state in which the second rotating machine MG2 generates an electric power while the generated electric power is supplied to the first rotating machine MG1. It is desirable to avoid or suppress this power recirculation state as much as possible. Therefore, in the region of the relatively small speed reduction ratio I, the power recirculation power can be reduced by establishing the O/DHV mode. By switching the U/DHV mode and the O/DHV mode depending on the speed reduction ratio I, the engine power can be transmitted by the second rotating machine MG2 at a lower torque.

Figure 12:
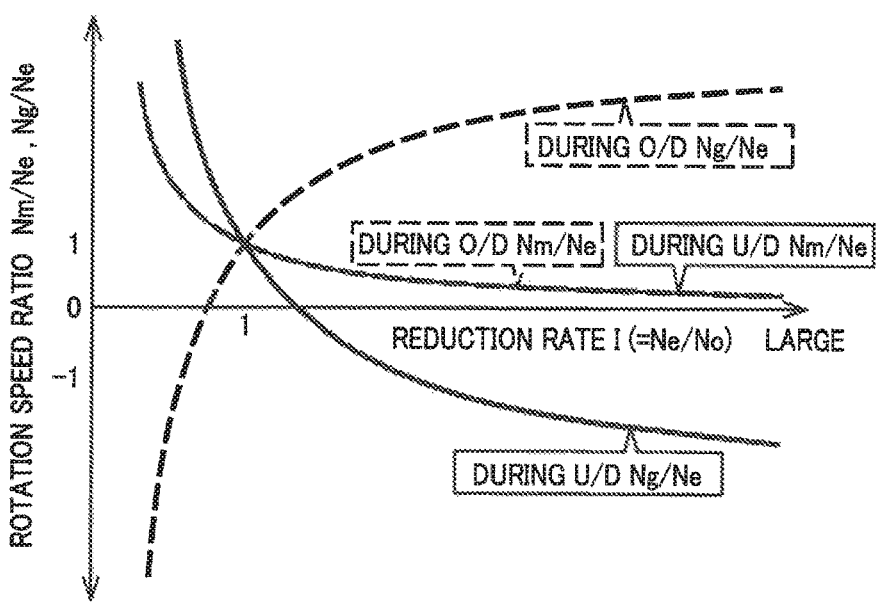
FIG. 12 is a diagram of an example of a rotation speed ratio of an MG1 rotation speed to an engine rotation speed and a rotation speed ratio of an MG2 rotation speed to the engine rotation speed.

FIG. 12 is a diagram of an example of a rotation speed ratio (Ng/Ne) of the MG1 rotation speed Ng to the engine rotation speed Ne and a rotation speed ratio (Nm/Ne) of the MG2 rotation speed Nm to the engine rotation speed Ne during the engine running in the forward running. In FIG. 12, in the region of the relatively large speed reduction ratio I of the first power transmission portion 24 such as greater than "1", the absolute value of the rotation speed ratio (Ng/Ne) is made smaller in the U/DHV mode as compared to the O/DHV mode. Therefore, in the region of the relatively large speed reduction ratio I, an increase in the MG1 rotation speed Ng can be suppressed by establishing the U/DHV mode. For example, if the U/DHV mode is established at the time of start using the relatively large speed reduction ratio I, the MG1 rotation speed Ng can be kept low. On the other hand, in the region of the relatively small speed reduction ratio I such as less than "1", the absolute value of the rotation speed ratio (Ng/Ne) is made larger in the U/DHV mode as compared to the O/DHV mode. Therefore, in the region of the relatively small speed reduction ratio I, an increase in the MG1 rotation speed Ng can be suppressed by establishing the O/DHV mode. By switching the U/DHV mode and the O/DHV mode depending on the speed reduction ratio I, the engine power can be transmitted by the first rotating machine MG1 at a lower speed.

Figure 13:
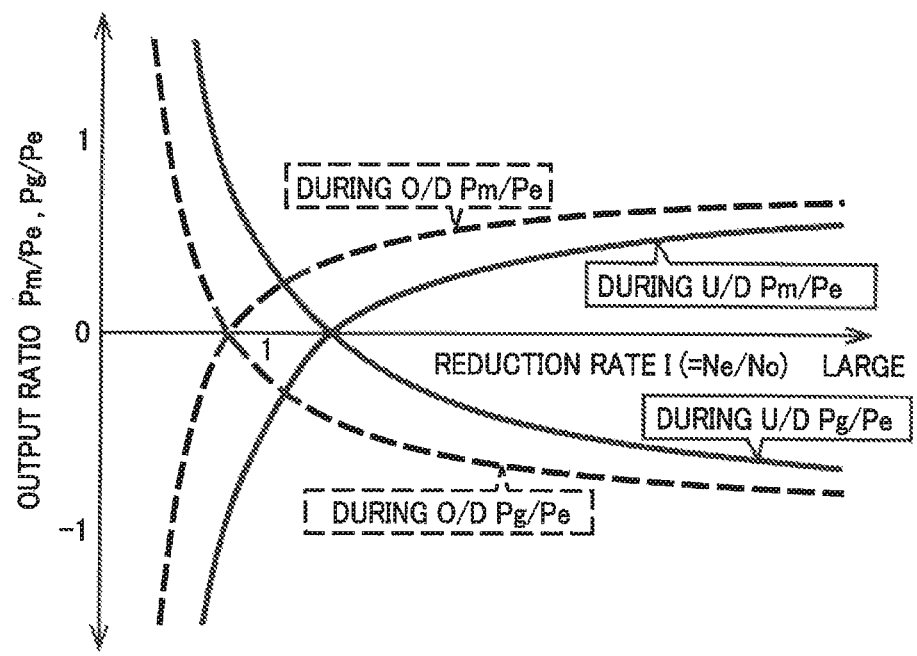
FIG. 13 is a diagram of an example of an output ratio of an MG1 power to the engine power and an output ratio of an MG2 power to the engine power.

FIG. 13 is a diagram of an example of an output ratio (Pg/Pe) of an MG1 power Pg to engine power Pe and an output ratio (Pm/Pe) of an MG2 power Pm to the engine power Pe during the engine running in the forward running. In FIG. 13, in the region in which the speed reduction ratio I of the first power transmission portion 24 is relatively large, the absolute values of the output ratio (Pg/Pe) and the output ratio (Pm/Pe) are made smaller in the U/DHV mode as compared to the O/DHV mode. Therefore, in the region of the relatively large speed reduction ratio I, both an increase in the MG1 power Pg and an increase in the MG2 power Pm can be suppressed by establishing the U/DHV mode. On the other hand, in the region of the relatively small speed reduction ratio I such as less than "1", the absolute values of the output ratio (Pg/Pe) and the output ratio (Pm/Pe) are made larger in the U/DHV mode as compared to the O/DHV mode. Additionally, when the output ratio (Pm/Pe) is a negative value (i.e., when the output ratio (Pg/Pe) is a positive value), this state is the power recirculation state. Therefore, in the region of the relatively small speed reduction ratio I, the power recirculation power can be reduced by establishing the O/DHV mode. By switching the U/DHV mode and the O/DHV mode depending on the speed reduction ratio I, the engine power can be transmitted by the rotating machines MG1, MG2 at a lower output (lower power).

As shown in the description with reference to FIGS. 11 to 13, by selectively using the U/DHV mode and the O/DHV mode such that the U/DHV mode is established at a high load of the engine 12 using the relatively large speed reduction ratio I and that the O/DHV mode is established at a low load of the engine 12, or at a high vehicle speed, using the relatively small speed reduction ratio I, the torques and the rotation speeds of the rotating machines MG1, MG2 are prevented or restrained from increasing, and the power recirculation power is reduced at high vehicle speed. This reduces the energy conversion loss in the electric path and leads to an improvement in fuel consumption. This also leads to miniaturization of the rotating machines MG1, MG2.

Both the U/DHV mode and the O/DHV mode allow the first power transmission portion 24 to function as the electric continuously variable transmission. When the speed reduction ratio I of the first power transmission portion 24 is "1", this is the state equivalent to the state of the direct coupling fixed stage mode (see FIG. 9) in which the clutch C1 and the clutch CR are both engaged. Therefore, preferably, the hybrid control portion 82 switches between the O/DHV mode (forward) in which the clutch C1 is engaged and the U/DHV mode in which the clutch CR is engaged, by switching the operating states of the clutch C1 and the clutch CR at the time of the synchronized state when the speed reduction ratio I is "I".

Figure 14:
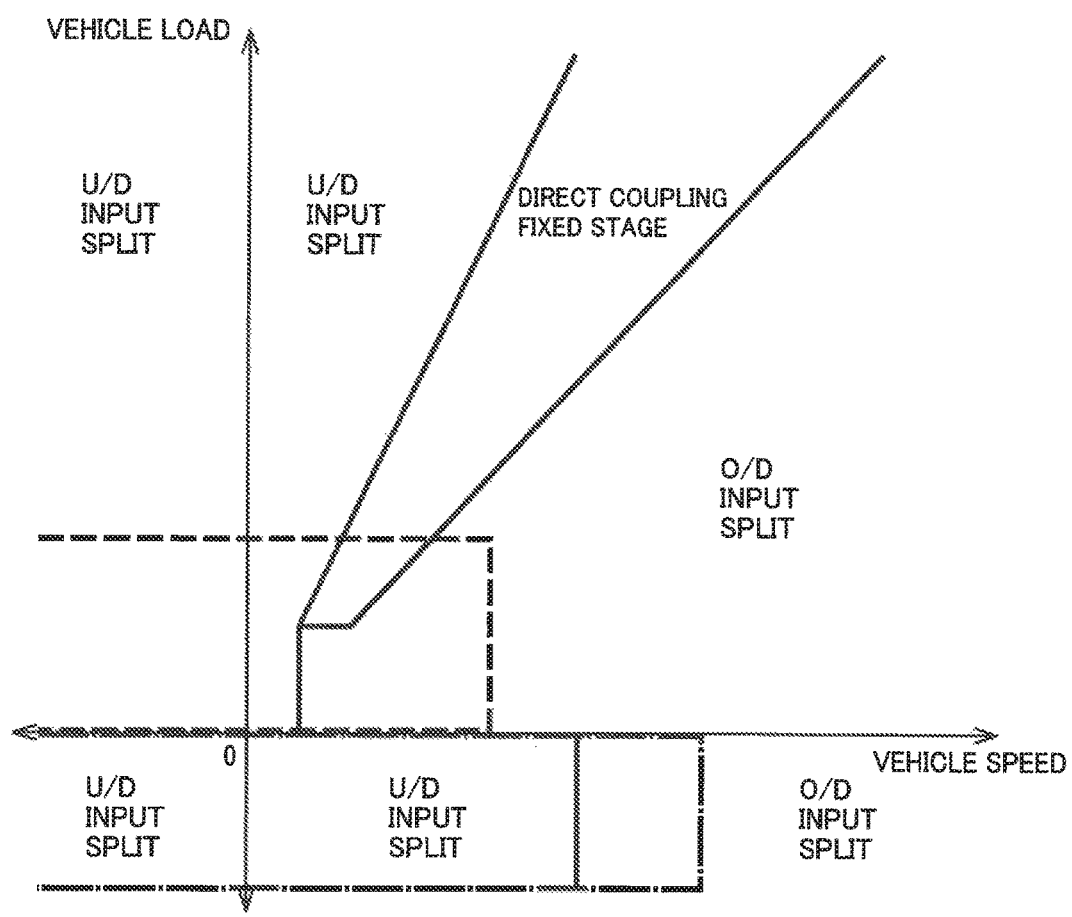
FIG. 14 is a diagram of an example of a running mode switching map used for the switching control between engine running and motor running and shows running with a battery capacity retained.
Figure 15:
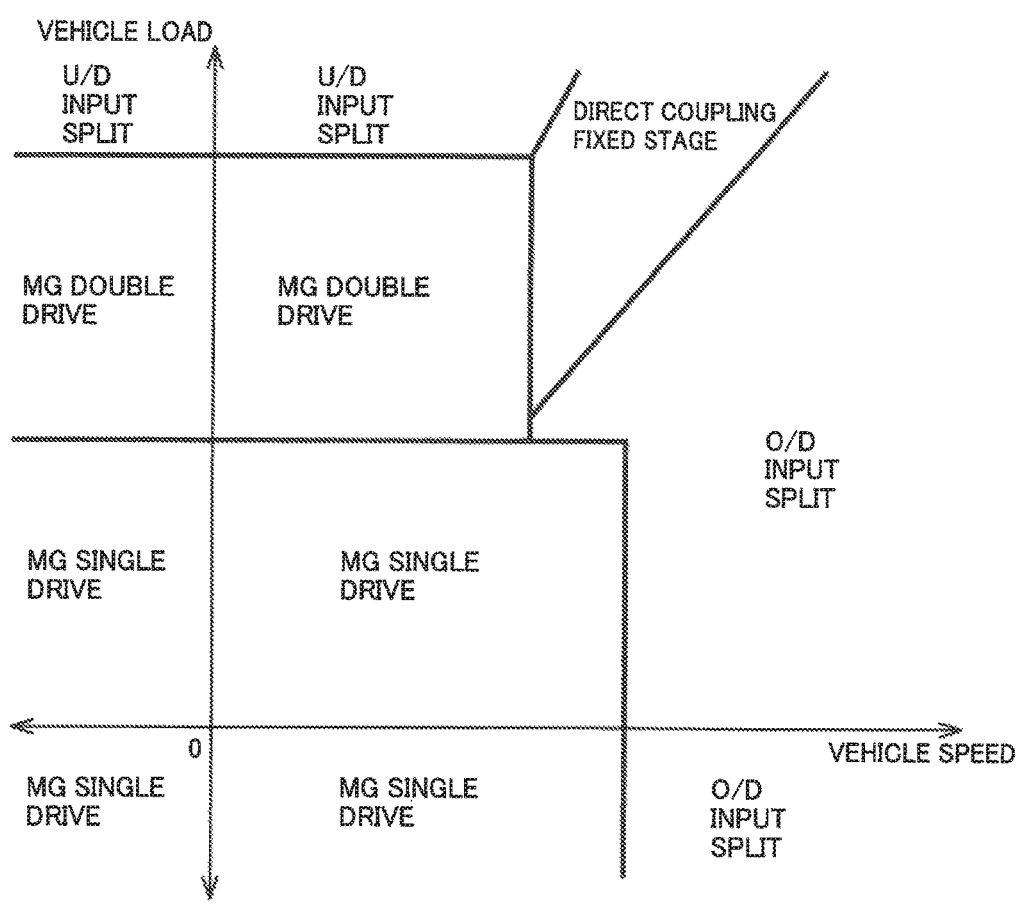
FIG. 15 is a diagram of an example of a running mode switching map used for the switching control between engine running and motor running and shows running with the battery capacity consumed.

Each of FIGS. 14 and 15 is a diagram of an example of running mode switching maps used for the switching control between the engine running and the motor running. These running mode switching maps each represent a relationship obtained and stored (i.e., predefined) empirically, or in design, in advance such that a boundary line between an engine running region and a motor running region is defined by using the vehicle speed V and running load of the vehicle 10 (hereinafter referred to as a vehicle load) (e.g., the required drive torque) as variables. FIG. 14 shows a state transition of the power transmission device 14 (i.e., the switching of the running mode of the vehicle 10) in CS (charge sustain) running that is running with the battery capacity SOC retained. FIG. 14 is used, for example, when the vehicle 10 is a hybrid vehicle etc. having the battery capacity SOC originally set relatively small. Additionally, FIG. 14 is used if a mode of retaining the battery capacity SOC is established when the vehicle 10 is a plug-in hybrid vehicle, a range extended vehicle, etc. having the battery capacity SOC originally set relatively large, for example. On the other hand, FIG. 15 shows a state transition of the power transmission device 14 (i.e., the switching of the running mode of the vehicle 10) in CD (charge depleting) running that is running with the battery capacity SOC consumed. FIG. 15 is used if a mode of consuming the battery capacity SOC is established when the vehicle 10 is a plug-in hybrid vehicle, a range extended vehicle, etc. having the battery capacity SOC originally set relatively large, for example. When the vehicle 10 is a hybrid vehicle etc. having the battery capacity SOC originally set relatively small, preferably, FIG. 15 is not used.

In FIG. 14, the regions of the running modes according to the running state such as the vehicle speed V and the vehicle load are set so as to facilitate the establishment of the U/DHV mode at a high load and the establishment of the O/DHV mode at a low load or a high vehicle speed. In the direct coupling fixed stage mode, the absence of power transmission via the rotating machines MG1, MG2 eliminates the heat loss associated with the conversion between mechanical energy and electric energy. This is advantageous for improving fuel economy and avoiding heat generation. Therefore, the region of the direct coupling fixed stage mode is set such that the direct coupling fixed stage mode is actively established at a high load such as during towing and at a high vehicle speed. If the electric power of the battery unit 20 can be taken out (or if the devices are completely warmed up due to warming-up of the engine 12 or operation of the engine 12), the power running of the second rotating machine MG2 is performed in the EV running in a region in which the operation efficiency of the engine 12 deteriorates. Therefore, the region of the single drive EV mode is set in the region of a low vehicle speed and a low load as indicated by the broken line. If the vehicle load is negative, deceleration running putting the engine braking using the negative torque of the engine 12 into action is performed in the U/DHV mode or the O/DHV mode. If the electric power of the battery unit 20 can be received, the regeneration by the second rotating machine MG2 is performed in the EV running. Therefore, the region of the single drive EV mode is set in the region in which the vehicle load is negative as indicated by the dashed-dotted line. In the running mode switching map in the CS running set as described above, the U/DHV mode is established in both forward running and reverse running at the time of start, for example. As a result, the engine power Pe can more effectively be used and the starting acceleration performance is therefore improved. As the vehicle speed V increases in forward running, the speed reduction ratio I of the first power transmission portion 24 reaches near "1". In this state, a shift to the direct coupling fixed stage mode is made. In low vehicle speed running, the engine rotation speed Ne becomes extremely low and, therefore, the U/DHV mode is directly shifted to the O/DHV mode. When the EV running is selected because a switch for selecting the EV running is operated by a driver, the single drive EV mode is established in the region as indicated by the broken line.

In FIG. 15, the regions of the running modes according to the running state such as the vehicle speed V and the vehicle load are set so as to establish the single drive EV mode in a region of low vehicle load and establish the double drive EV mode in a region of high vehicle load. In the double drive EV mode, based on the operation efficiency of the first rotating machine MG1 and the second rotating machine MG2 (e.g., for the purpose of improving the specific power consumption, reducing the temperature of the rotating machines MG1, MG2, and reducing the temperature of the electric power control unit 18), a power sharing ratio between the first rotating machine MG1 and the second rotating machine MG2 is determined. Additionally, depending on the maximum output of the rotating machines MG1, MG2, or if a rise in the rotation speed of any rotating element of the power transmission device 14 due to a rise in the vehicle speed V during the EV running is alleviated by operating the engine 12, as shown in FIG. 15, the region of the HV running mode may be set in the high load region and the high vehicle speed region so as to make a shift to a state in which the engine 12 is used as a drive power source for running. In the region in which the vehicle load is negative, the region of the single drive EV mode is set such that the regeneration by the second rotating machine MG2 is performed in the EV running. In the single drive EV mode, the first rotating machine MG1 and the engine 12 are disconnected from each other (i.e., the power transmission between the first rotating machine MG1 and the engine 12 is interrupted) and, therefore, as shown in FIG. 15, the region of the single drive EV mode on the high vehicle speed side may be extended toward the higher vehicle speed side as compared to the double drive EV mode. In the running mode switching map in the CD running set as described above, for example, when the vehicle speed V increases, the rotation speeds of the elements of the rotating machines MG1, MG2, the planetary gear mechanisms 48, 50, etc. increase and, therefore, a shift is made to the HV running mode as set in the running mode switching map in the CS running to provide control such that the rotation speeds of the elements fall within a limit. For the regeneration in the region in which the vehicle load is negative, the double drive EV mode may be set instead of the single drive EV mode. An upper limit of the drive torque or the vehicle speed V may be set so as not to start the engine 12 so that the fuel is not consumed.

By applying the vehicle speed V and the vehicle load (e.g., the required drive torque) to the running mode switching map as shown in FIG. 14 or 15, the hybrid control portion 82 determines which running mode is the running mode to be established. When the determined running mode is the current running mode, the hybrid control portion 82 keeps the current running mode established as it is and, on the other hand, when the determined running mode is different from the current running mode, the hybrid control portion 82 establishes the determined running mode instead of the current running mode.

When establishing the single drive EV mode, the hybrid control portion 82 enables the EV running using only the second rotating machine MG2 as the drive power source for running. When establishing the double drive EV mode, the hybrid control portion 82 enables the EV running using both the first rotating machine MG1 and the second rotating machine MG2 as the drive power source for running.

When establishing the O/DHV mode or the U/DHV mode, the hybrid control portion 82 enables the engine running in which the electric generation of the first rotating machine MG1 takes charge of the reaction force to the power of the engine 12 so as to transmit the engine direct torque to the first ring gear R1 while the second rotating machine MG2 is driven by the electric power generated by the first rotating machine MG1 to transmit a torque to the drive wheels 16 for the running. In the O/DHV mode or the U/DHV mode, the hybrid control portion 82 operates the engine 12 at an engine operating point (i.e., an engine operating point represented by the engine rotation speed Ne and the engine torque Te) in consideration of a known optimum fuel consumption line of the engine 12. In the O/DHV mode or the U/DHV mode, the second rotating machine MG2 can be driven also by the electric power from the battery unit 20 in addition to the electric power generated by the first rotating machine MG1.

When establishing the direct coupling fixed stage mode, the hybrid control portion 82 enables the engine running in which the power of the engine 12 is directly output from the first ring gear R1 for the running. In the direct coupling fixed stage mode, in addition to the power of the engine 12, the hybrid control portion 82 also can drive the first rotating machine MG1 with the electric power from the battery unit 20 to directly output the power of the first rotating machine MG1 from the first ring gear R1 or can drive the second rotating machine MG2 with the electric power from the battery unit 20 to transmit the power of the second rotating machine MG2 to the drive wheels 16 for the running.

When the vehicle stops, the hybrid control portion 82 establishes the output shaft fixed stage mode if the battery capacity SOC is equal to or less than a predetermined capacity determined as being in need of charging. When establishing the output shaft fixed stage mode, the hybrid control portion 82 allows the electric generation of the first rotating machine MG1 to take charge of the reaction force to the power of the engine 12 and charges the battery unit 20 through the electric power control unit 18 with the electric power generated by the first rotating machine MG1.

As described above, in the single drive EV mode, the engine 12 is put into the corotation state by engagement of the clutch C1 or the clutch CR or the brake B1 and, in this state, the engine rotation speed Ne can be increased by the first rotating machine MG1. Therefore, the electronic control device 80 functionally includes a start control means, i.e., a start control portion 86, that puts the clutch C1 or the clutch CR or the brake B1 into the engaged state when the engine 12 is started from the single drive EV mode and that raises the engine rotation speed Ne by the first rotating machine MG1 in this state as needed before ignition.

In the running mode switching map as shown in FIG. 14, the U/DHV mode and the O/DHV mode are also set in the region in which the region of the single drive EV mode is set as indicated by the broken line and the dashed-dotted line. Therefore, it is conceivable that even in the EV running in which the engine 12 is in the operation stop state, any engagement device of the clutch C1, the brake B1, and the clutch CR is put into the engaged state in accordance with the region of the U/DHV mode and the region of the O/DHV mode in the running mode switching map. When the vehicle speed V is changed, or the shift lever operation position POSsh is switched between a forward running position D and a reverse running position R by a driver operation, during the EV running as described above, the respective operating states of the clutch C1 or the brake B1 and the clutch CR must also be switched in accordance with a change of the HV running mode. In particular, when the O/DHV mode and the U/DHV mode are switched, the engaged state of only the clutch C1 or the engaged state of only the brake B1 out of the clutch C1, the brake B1, and the clutch CR is switched to the engaged state of only the clutch CR, or the engaged state of only the clutch CR out of the clutch C1, the brake B1, and the clutch CR is switched to the engaged state of only the clutch C1 or the engaged state of only the brake B1. Therefore, when the O/DHV mode and the U/DHV mode are switched, the respective operating states of the clutch C1 or the brake B1 and the clutch CR are switched.

In the switching between the O/DHV mode and the U/DHV mode, the respective operating states of the clutch C1 or the brake B1 and the clutch CR are switched in a state in which the change in the speed reduction ratio I after the switching is suppressed by utilizing the fact that the first power transmission portion 24 is allowed to function as the electric continuously variable transmission (e.g., utilizing the fact that the engine rotation speed Ne can be controlled to an arbitrary value regardless of the vehicle speed V). However, in the switching between the O/DHV mode and the U/DHV mode during the EV running, the engine 12 is in the operation stop state, and it is desirable to maintain the engine 12 in the rotation stop state. Therefore, during the running in the rotation stop state of the engine 12, when the respective operating states of the clutch C1 or the brake B1 and the clutch CR are switched, the switching to the engaged state is more likely to be performed while a differential rotation speed ΔNc is large in the engagement-switching engagement device that is the engagement device to be put into the engaged state after the switching. The differential rotation speed ΔNc is a rotation speed difference in the rotation speed between one and the other of the rotating members to which the engagement-switching engagement device is coupled.

Figure 16:
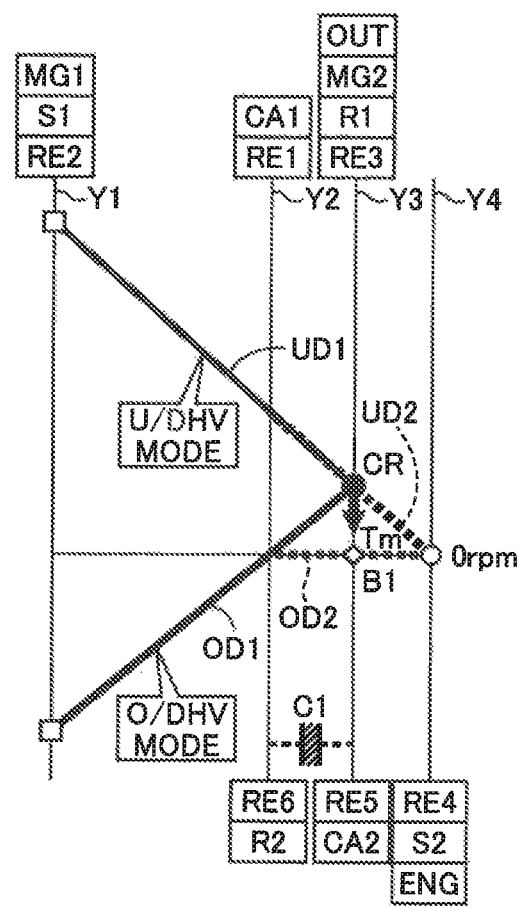
FIG. 16 is a diagram for explaining an example of states before and after switching when the O/DHV mode and the U/DHV mode are switched during running in the single drive EV mode in a rotation stop state of the engine.

FIG. 16 is a diagram using the same collinear chart as the collinear charts of FIGS. 3 to 10 for explaining an example of states before and after switching when the O/DHV mode and the U/DHV mode are switched during running in the single drive EV mode in the rotation stop state of the engine 12. In FIG. 16, since the switching from the O/DHV mode to the U/DHV mode has occurred during running when the regeneration is performed by the second rotating machine MG2 alone while the engine 12 is in the rotation stop state, the state of a solid line OD1 and a broken line OD2 corresponding to the O/DHV mode with the clutch C1 put into the engaged state is switched to the state of a solid line UD1 and a broken line UD2 corresponding to the U/DHV mode with the clutch CR put into the engaged state. In this case, when the clutch C1 is switched to the released state and the clutch CR is switched to the engaged state in the state corresponding to the O/DHV mode, the engine rotation speed Ne may be generated in the positive rotation due to corotation. Additionally, the first rotating machine MG1 is rotated in the positive direction due to a torque capacity (i.e., clutch torque) Tcr of the clutch CR (hereinafter referred to as a CR torque Tcr). In this way, the engine 12 and the first rotating machine MG1 having an inertia rotate and cause a shock at the drive wheels 16. Such an engagement shock associated with the engagement of the clutch CR may increase when the differential rotation speed ΔNc of the clutch CR is larger. It is desirable that the switching between the O/DHV mode and the U/DHV mode is performed without generating such an engagement shock. Also in the switching from the U/DHV mode to the O/DHV mode, when the clutch C1 is switched to the engaged state, the engine rotation speed Ne may be generated in the positive rotation due to corotation.

Therefore, when switching the O/DHV mode and the U/DHV mode during the EV running, the electronic control device 80 engages the engagement-switching engagement device after the differential rotation speed ΔNc in the engagement-switching engagement device is reduced by the first rotating machine MG1 while the clutch C1, the brake B1, and the clutch CR are all in the released state. If it is attempted to reduce the differential rotation speed ΔNc in the engagement-switching engagement device by the first rotating machine MG before the switching when any of the clutch C1, the brake B1, and the clutch CR is in the engaged state during the EV running, the engine rotation speed Ne is increased (see combination with engine brake in the single drive EV mode of FIG. 2). On the other hand, if the clutch C1, the brake B1, and the clutch CR are all in the released state, the engine 12 can be maintained in a rotation stop state without generating the engine rotation speed Ne due to corotation even when it is attempted to reduce the differential rotation speed ΔNc in the engagement-switching engagement device by the first rotating machine MG1 (see drive in the single drive EV mode of FIG. 2). By engaging the engagement-switching engagement device after the differential rotation speed ΔNc is reduced, the engagement shock can be suppressed when the O/DHV mode and the U/DHV mode are switched (i.e., when the respective operating states of the clutch C1 or the brake B1 and the clutch CR are switched).

To achieve the control of engaging the engagement-switching engagement device after reducing the differential rotation speed ΔNc in the engagement-switching engagement device by the first rotating machine MG1 described above, the electronic control device 80 further includes an engagement control means, i.e. an engagement control portion 87, and a differential rotation suppression control means, i.e., a differential rotation suppression control portion 88.

If the hybrid control portion 82 determines to switch between the O/DHV mode and the U/DHV mode during the EV running using the second rotating machine MG2 during running in the rotation stop state of the engine 12, the engagement control portion 87 switches a release-switching engagement device, i.e., an engagement device released at the time of switching between the O/DHV mode and the U/DHV mode out of the clutch C1, the brake B1, and the clutch CR, into a released state. The engagement control portion 87 outputs a command for lowering the hydraulic pressure of the release-switching engagement device to provide release control of the release-switching engagement device. In this way, if the hybrid control portion 82 determines to switch between the O/DHV mode and the U/DHV mode during the EV running using the second rotating machine MG2 during running in the rotation stop state of the engine 12, the engagement control portion 87 puts all the engagement devices of the clutch C1, the brake B1, and the clutch CR into the released state.

The engagement control portion 87 determines whether the hydraulic pressure of the release-switching engagement device is sufficiently lowered, for example, based on whether the hydraulic pressure of the release-switching engagement device is lower than a predetermined release pressure. This predetermined release pressure is a predefined threshold value for enabling the determination of the absence of the torque capacity of the release-switching engagement device, for example. The hydraulic pressure of the release-switching engagement device is, for example, a hydraulic pressure sensor value, or an estimated hydraulic pressure based on a command hydraulic pressure and an elapsed time from a command start time point. Alternatively, the engagement control portion 87 may determine whether the hydraulic pressure of the release-switching engagement device is sufficiently lowered, based on a signal from a hydraulic switch operating at the predetermined release pressure. The engagement control portion 87 provides the release control of the release-switching engagement device until it is determined that the hydraulic pressure of the release-switching engagement device is sufficiently lowered.

When the respective operating states of the clutch C1 or the brake B1 and the clutch CR are switched by the engagement control portion 87 because the hybrid control portion 82 determines to switch between the O/DHV mode and the U/DHV mode during the EV running using the second rotating machine MG2 during running in the rotation stop state of the engine 12, the differential rotation suppression control portion 88 controls the operation of the first rotating machine MG1 such that the differential rotation speed ΔNc in the engagement-switching engagement device is made equal to or less than a predetermined value (first predetermined value) after the engagement control portion 87 determines that the hydraulic pressure of the release-switching engagement device is sufficiently lowered (i.e., while all the engagement devices of the clutch C1, the brake B1, and the clutch CR are in the released state). Since all the engagement devices of the clutch C1, the brake B, and the clutch CR are in the released state, a shock does not occur even when the MG1 rotation speed Ng is changed. The predetermined value is a predefined threshold value for determining that the differential rotation speed ΔNc reaches a speed capable of suppressing or avoiding the engagement shock when the engagement-switching engagement device is switched to the engaged state, for example. Preferably, the predetermined value is a predefined threshold value for determining whether input/output rotation speeds of the engagement-switching engagement device in the released state are synchronized (i.e., whether the rotation speeds are synchronized between one and the other of the rotating members to which the engagement-switching engagement device is coupled). Controlling the operation of the first rotating machine MG1 so as to make the differential rotation speed ΔNc in the engagement-switching engagement device equal to or less than the predetermined value is synchronization control of rotation speed in the engagement-switching engagement device and is referred to as rotation speed synchronization control by the first rotating machine MG1. As a result, the engagement-switching engagement device is switched to the engaged state when the differential rotation speed ΔNc in the engagement-switching engagement device is zero or substantially zero, so that the engagement shock can be avoided or substantially avoided.

The differential rotation suppression control portion 88 determines whether the synchronization of rotation speed in the engagement-switching engagement device is completed, for example, based on whether the differential rotation speed ΔNc in the engagement-switching engagement device is equal to or less than the predetermined value. The differential rotation suppression control portion 88 provides the rotation speed synchronization control by the first rotating machine MG1 until it is determined that the synchronization of rotation speed in the engagement-switching engagement device is completed.

The engagement control portion 87 switches the engagement-switching engagement device to the engaged state after the differential rotation suppression control portion 88 determines that the synchronization of rotation speed in the engagement-switching engagement device is completed. The engagement control portion 87 outputs a command for increasing the hydraulic pressure of the engagement-switching engagement device to provide the engagement control of the engagement-switching engagement device.

The engagement control portion 87 determines whether the hydraulic pressure of the engagement-switching engagement device is sufficiently increased, for example, based on whether the hydraulic pressure of the engagement-switching engagement device is higher than a predetermined engagement pressure. This predetermined engagement pressure is a threshold value predefined in accordance with a required torque capacity for enabling the determination that the torque capacity of the engagement-switching engagement device has reached the required torque capacity, for example. The hydraulic pressure of the engagement-switching engagement device is, for example, a hydraulic pressure sensor value, or an estimated hydraulic pressure based on a command hydraulic pressure and an elapsed time from a command start time point. The engagement control portion 87 provides the engagement control of the engagement-switching engagement device until it is determined that the hydraulic pressure of the engagement-switching engagement device is sufficiently increased.

Although the engagement control of the engagement-switching engagement device is provided after the synchronization of rotation speed in the engagement-switching engagement device is completed, it takes a reasonable time for switching the engagement-switching engagement device to the engaged state. Accordingly, even after the differential rotation speed ΔNc in the engagement-switching engagement device is once made equal to or less than the predetermined value by the rotation speed synchronization control by the first rotating machine MG1, the differential rotation speed ΔNc may change (i.e., become larger than the predetermined value) in accordance with a change in the vehicle speed V (having the same meaning as the output rotation speed No) etc. during transition while the engagement-switching engagement device is switched to the engaged state by the engagement control portion 87. Therefore, to restrain the differential rotation speed ΔNc from becoming larger and avoid the increase in the engagement shock, the differential rotation suppression control portion 88 controls the operation of the first rotating machine MG1 so that the differential rotation speed ΔNc in the engagement-switching engagement device is made equal to or less than the predetermined value even during transition while the engagement-switching engagement device is switched to the engaged state by the engagement control portion 87.

When the engagement-switching engagement device is switched to the engaged state, the torque capacity is not generated until completion of so-called packing, i.e., elimination of clearance of friction materials of the engagement-switching engagement device. Therefore, it is conceivable that the packing of the engagement-switching engagement device is completed during the rotation speed synchronization control by the first rotating machine MG1. Preferably, the engagement control portion 87 provides preparation control (also referred to as standby control) for switching the engagement-switching engagement device to the engaged state (also referred to as standby control) during the transition while the rotation speed synchronization control by the first rotating machine MG1 is provided by the differential rotation suppression control portion 88. This standby control is preparation control of generating a torque capacity of the engagement-switching engagement device. In this standby control, for a hydraulic pressure instruction value of the engagement-switching engagement device, first, a temporary high hydraulic pressure is output for filling a piston chamber with the hydraulic fluid oil by moving a pressure regulating valve supplying the hydraulic pressure of the engagement-switching engagement device and, subsequently, a constant standby pressure is output for moving a piston of the engagement-switching engagement device to complete the packing. As a result, by providing the standby control in parallel with the rotation speed synchronization control by the first rotating machine MG1, the engagement-switching engagement device can be put into the engaged state immediately after the completion of the synchronization of the rotation speed in the engagement-switching engagement device so as to suppress a response delay attributable to an engagement delay of the engagement-switching engagement device at the time of switching of the respective operating states of the clutch C1 or the brake B1 and the clutch CR (i.e., switching between the O/DHV mode and the U/DHV mode). This standby control may be control provided until the piston chamber is filled with the hydraulic fluid oil.

The engagement control portion 87 determines whether the standby control is completed, for example, based on a hydraulic pressure sensor value, or an estimated hydraulic pressure based on a command hydraulic pressure and an elapsed time from a command start time point, or a detection value of a piston stroke sensor. The engagement control portion 87 provides the standby control until it is determined that the standby control is completed. If the standby control is provided, the engagement control portion 87 switches the engagement-switching engagement device to the engaged state after the differential rotation suppression control portion 88 determines that the synchronization of rotation speed in the engagement-switching engagement device is completed and it is determined that the standby control is completed.

Since the rotation speed synchronization control by the first rotating machine MG1 is provided when all the engagement devices of the clutch C1, the brake B1, and the clutch CR are in the released state, no reaction force element basically exists for the operation of the first rotating machine MG1. However, at the time of the rotation speed synchronization control by the first rotating machine MG1, a variation in output torque of the drive wheels 16 (i.e., the drive torque) may occur because a rotating element other than the first rotating machine MG1 acts as a reaction force element. Therefore, the electronic control device 80 functionally includes a torque compensation control means, i.e., a torque compensation control portion 89, outputting a torque from the second rotating machine MG2 so as to suppress the variation in the drive torque during transition while the rotation speed synchronization control by the first rotating machine MG1 is provided by the differential rotation suppression control portion 88. As a result, since the M2 torque Tm is output so as to suppress the variation in the drive torque, such a variation in the drive torque is more easily canceled.

Figure 17:
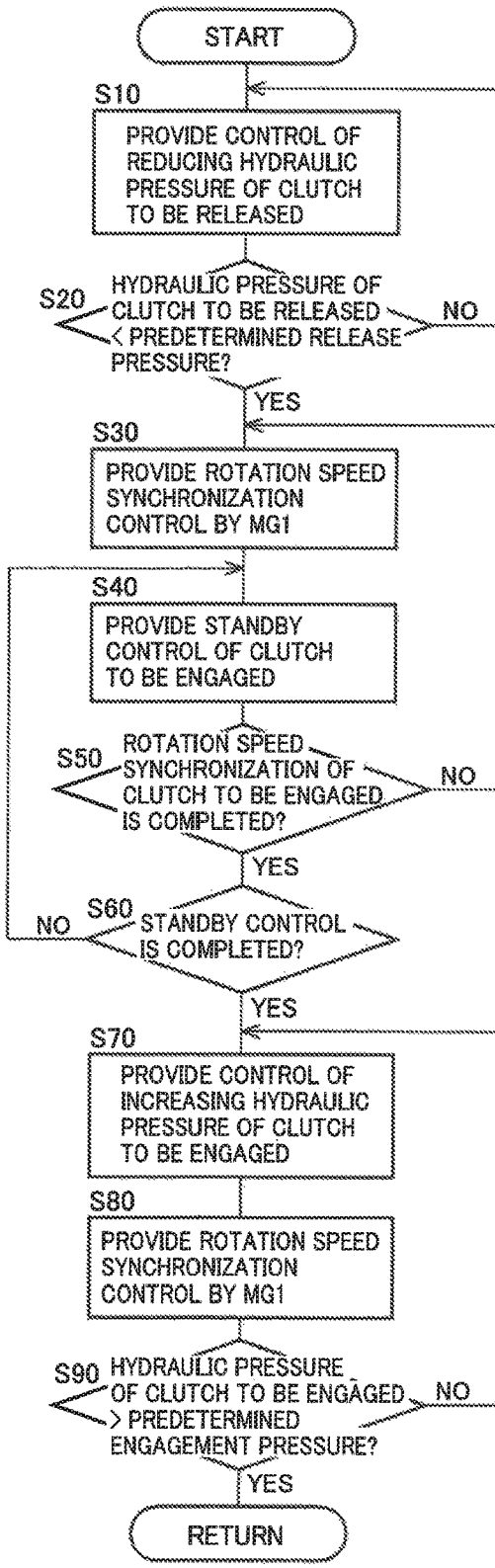
FIG. 17 is a flowchart for explaining a main portion of the control operation of an electronic control device, i.e., the control operation for suppressing the engagement shock when respective operating states of a clutch C1 or a brake B1 and a clutch CR are switched during running in the rotation stop state of the engine.
Figure 18:
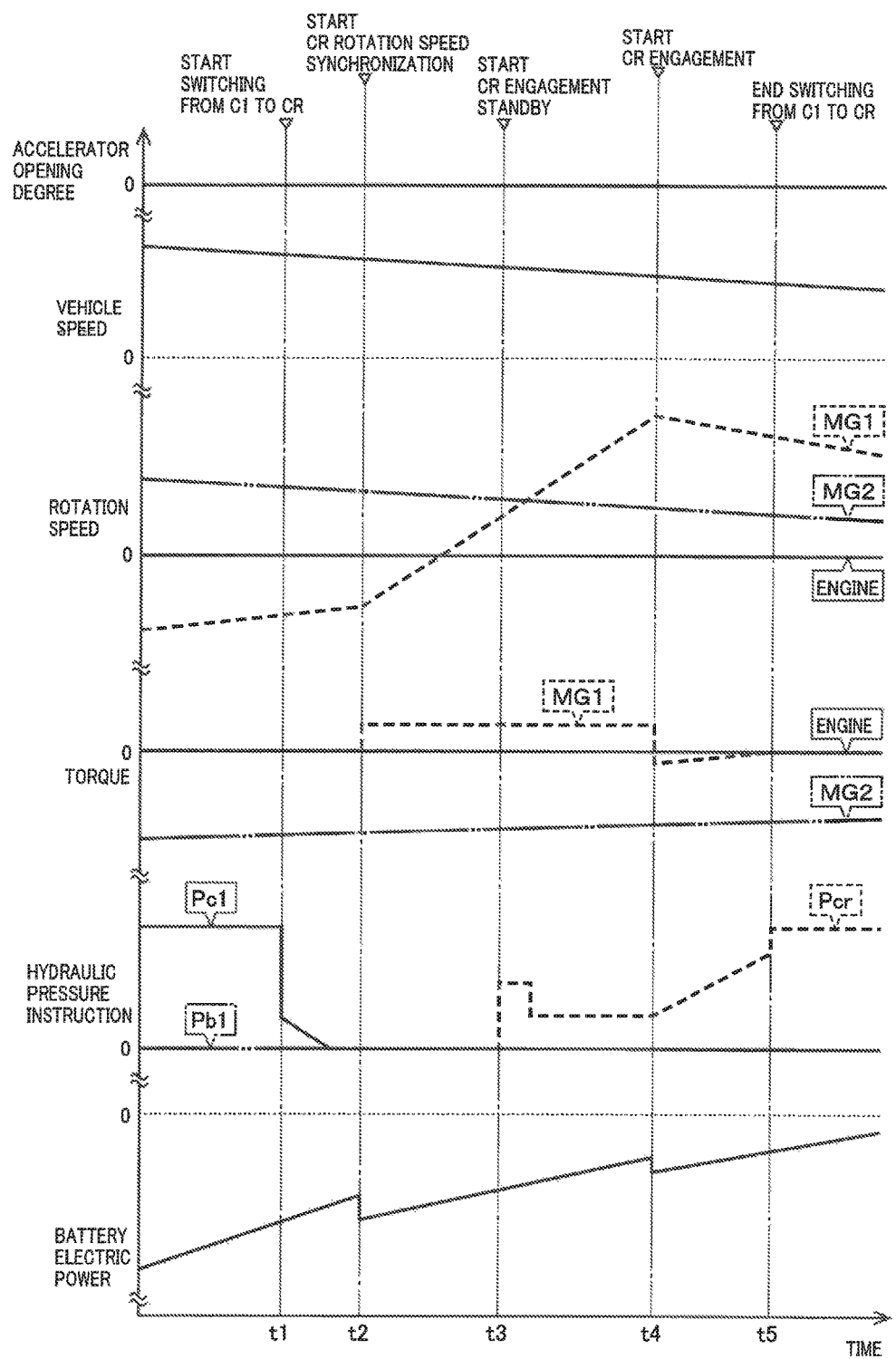
FIG. 18 is a diagram of an example of a time chart when the control operation shown in the flowchart of FIG. 17 is performed.

FIG. 17 is a flowchart for explaining a main portion of the control operation of the electronic control device 80, i.e., the control operation for suppressing the engagement shock when the respective operating states of the clutch C1 or the brake B1 and the clutch CR are switched during running in the rotation stop state of the engine 12, and the control operation is performed when switching between the O/DHV mode and the U/DHV mode is determined during the EV running using only the second rotating machine MG2, for example. FIG. 18 is a diagram of an example of a time chart when the control operation shown in the flowchart of FIG. 17 is performed.

In FIG. 17, first, at step (hereinafter, step is omitted) S10 corresponding to the function of the engagement control portion 87, the release control of lowering the hydraulic pressure of the release-switching engagement device is provided. If the device is already released, this control is not necessary. Subsequently, at S20 corresponding to the function of the engagement control portion 87, it is determined whether the hydraulic pressure of the release-switching engagement device is sufficiently lowered, based on whether the hydraulic pressure of the release-switching engagement device is lower than the predetermined release pressure. If the determination of S20 is negative, the operation returns to S10. If the determination in S20 is affirmative, the rotation speed synchronization control by the first rotating machine MG1 is provided at S30 corresponding to the function of the differential rotation suppression control portion 88. During this rotation speed synchronization control, a torque may be output from the second rotating machine MG2 so as to suppress the variation in the drive torque. Subsequently, at S40 corresponding to the function of the engagement control portion 87, the standby control of the engagement-switching engagement device is provided. Subsequently, at S50 corresponding to the function of the differential rotation suppression control portion 88, it is determined whether the synchronization of rotation speed in the engagement-switching engagement device is completed. If the determination of 850 is negative, the operation returns to S30. If the determination of S50 is affirmative, it is determined at S60 corresponding to the function of the engagement control portion 87 whether the standby control of the engagement-switching engagement device is completed. If the determination of S60 is negative, the operation returns to S40. If the determination of S60 is affirmative, the engagement control of increasing the hydraulic pressure of the engagement-switching engagement device is provided at S70 corresponding to the function of the engagement control portion 87. Subsequently, at S80 corresponding to the function of the differential rotation suppression control portion 88, the rotation speed synchronization control by the first rotating machine MG1 is provided also during transition of the engagement control of the engagement-switching engagement device at S70. Subsequently, at S90 corresponding to the function of the engagement control portion 87, it is determined whether the hydraulic pressure of the engagement-switching engagement device is sufficiently increased, based on whether the hydraulic pressure of the engagement-switching engagement device is higher than the predetermined engagement pressure. Therefore, at S90, it is determined whether a state transition of switching between the O/DHV mode and the U/DHV mode is completed. If the determination of S90 is negative, the operation returns to S70. If the determination of S90 is affirmative, this routine is terminated.

FIG. 18 shows a scene of switching from the O/DHV mode to the U/DHV mode during deceleration in the EV running while the regeneration is performed by the second rotating machine MG2 alone. This scene corresponds to deceleration when the accelerator is off and the wheel brake is on within the region indicated by the dashed-dotted line of FIG. 14, for example. In FIG. 18, because switching from the O/DHV mode to the U/DHV mode is determined in association with a reduction in the vehicle speed V, it is determined to start switching the engagement device put into the engaged state from the clutch C1 to the clutch CR (see time t1). In this way, the switching in this case occurs during the EV regeneration. Due to this determination, the hydraulic pressure value is lowered in the hydraulic pressure instruction for the clutch C1 serving as the release-switching engagement device (see time t1 to time t2). Subsequently, when it is determined that the torque capacity of the clutch C1 is sufficiently lowered, the synchronization of rotation speed is started in the clutch CR serving as the engagement-switching engagement device (see time t2). The reduction in the torque capacity is determined based on the hydraulic pressure value of the hydraulic instruction, for example. In another form, the determination may be made based on the signal from the hydraulic switch. The synchronization of rotation speed is performed through the control of the MG1 torque Tg (see time t2 to time t4). The time required for completing the synchronization is calculated by the electronic control device 80. During the rotation speed synchronization control by the first rotating machine MG1, the standby control of the clutch CR is started in time for completion of the rotation speed synchronization control (see time t3). When it is determined that the synchronization of the rotation speed in the clutch CR is completed, the hydraulic pressure value of the hydraulic pressure instruction for the clutch CR is increased, and the engagement of the clutch CR is started so that the torque capacity of the clutch CR is generated (see time t4). Whether the synchronization of the rotation speed is completed is determined based on signals from various rotation speed sensors such as resolvers included in the rotating machines MG1, MG2, for example. If the rotating machines MG1, MG2 are in a form without a resolver, a current sensor value for detecting a current to the rotating machines MG1, MG2 may be used for making the determination by using an estimated rotation speed calculated by the electronic control device 80. The rotation speed synchronization control by the first rotating machine MG1 is provided even during the transition while the torque capacity of the clutch CR is increased (see time t4 to time t5). As a result, the engagement shock is further suppressed or the engagement shock is more reliably avoided. When the torque capacity of the clutch CR is set to a sufficient value, the hydraulic pressure value of the hydraulic pressure instruction is set to the maximum hydraulic pressure, and the state transition for switching from the O/DHV mode to the U/DHV mode is terminated (see time t5).

As described above, according to this example, when the respective operating states of the clutch C1 or the brake B1 and the clutch CR are switched, the operation of the first rotating machine MG1 is controlled so as to make the differential rotation speed $\Delta Nc$ in the engagement-switching engagement device equal to or less than the predetermined value while all these engagement devices are in the released state and, therefore, the differential rotation speed $\Delta Nc$ in the engagement-switching engagement device may be made smaller by the operation of the first rotating machine MG1 while the engine 12 is kept in the rotation stop state. Since the engagement-switching engagement device is engaged after the differential rotation speed $\Delta Nc$ is reduced, the engagement shock can be suppressed when the respective operating states of the clutch C1 or the brake B1 and the clutch CR are switched during the running in the rotation stop state of the engine 12.

According to this example, since the operation of the first rotating machine MG1 is controlled so as to make the differential rotation speed $\Delta Nc$ equal to or less than the predetermined value even during transition while the engagement-switching engagement device is put into the engaged state, the differential rotation speed $\Delta Nc$ can be restrained from increasing so that an increase in engagement shock can be avoided.

Other examples of the present invention will be described. In the following description, portions common to the examples will be denoted by the same reference numerals and will not be described.

Example 2

In Example 1 described above, when the O/DHV mode and the U/DHV mode are switched during the EV running, the rotation speed synchronization control by the first rotating machine MG1 is performed after switching the release-switching engagement device to the released state and, subsequently, the engagement-switching engagement device is switched to the engaged state. On the other hand, when the engine 12 is started from the single drive EV mode, the clutch C1 or the clutch CR or the brake B1 is put into the engaged state and, in this state, the engine rotation speed Ne is raised by the first rotating machine MG1 before ignition. Therefore, when the start of the engine 12 is requested during the rotation speed synchronization control by the first rotating machine MG1, the engagement shock may tend to increase if the rotation speed synchronization control is interrupted to initiate the engine start (i.e., if the engagement-switching engagement device is engaged to initiate the engine start while the differential rotation speed $\Delta Nc$ in the engagement-switching engagement device is still large).

Therefore, if the start of the engine 12 is requested during the rotation speed synchronization control by the first rotating machine MG1, the electronic control device 80 delays the initiation of the start of the engine 12 to continue the rotation speed synchronization control by the first rotating machine MG1, switches the engagement-switching engagement device to the engaged state after completion of the rotation speed synchronization control, and initiates the engine start.

Specifically, the differential rotation suppression control portion 88 determines whether the rotation speed synchronization control by the first rotating machine MG1 is being provided. The hybrid control portion 82 determines whether the start of the engine 12 is requested, for example, based on whether the battery capacity SOC is equal to or less than a predetermined capacity or based on whether the required drive torque becomes equal to or greater than a predetermined required drive torque in accordance with an accelerator pedal depressing operation.

When the differential rotation suppression control portion 88 determines that the rotation speed synchronization control by the first rotating machine MG1 is not being provided, and the hybrid control portion 82 determines that the start of the engine 12 is requested, the start control portion 86 provides an engine start control such that the engine rotation speed Ne is raised by the first rotating machine MG1 as needed before ignition in the engaged state of the clutch C1 or the clutch CR or the brake B1.

When the differential rotation suppression control portion 88 determines that the rotation speed synchronization control by the first rotating machine MG1 is being provided, and the hybrid control portion 82 determines that the start of the engine 12 is requested, the start control portion 86 starts the engine start control after the differential rotation suppression control portion 88 determines that the synchronization of rotation speed in the engagement-switching engagement device is completed and the engagement control portion 87 determines that the hydraulic pressure of the engagement-switching engagement device is sufficiently increased so that the engagement control of the engagement-switching engagement device is completed.

In this regard, it is also conceivable that when the start of the engine 12 is requested during provision of the rotation speed synchronization control by the first rotating machine MG1, the engine start is advanced by allowing a slight engagement shock instead of giving priority to the suppression of the engagement shock. Therefore, if the hybrid control portion 82 determines that the start of the engine 12 is requested during provision of the rotation speed synchronization control by the first rotating machine MG1, the differential rotation suppression control portion 88 may determine whether the synchronization of rotation speed in the engagement-switching engagement device is completed, for example, based on whether the differential rotation speed ΔNc in the engagement-switching engagement device is equal to or less than a second predetermined value higher than the predetermined value. The second predetermined value is a predefined threshold value for determining that the differential rotation speed ΔNc reaches a speed capable of suppressing the engagement shock to some extent when the engagement-switching engagement device is switched to the engaged state and capable of advancing the initiation of the start of the engine 12 as compared to the case of using the predetermined value, for example. Therefore, if the hybrid control portion 82 determines that the start of the engine 12 is requested during execution of the rotation speed synchronization control by the first rotating machine MG1 i.e. by the differential rotation suppression control portion 88, the engagement control portion 87 switches the engagement-switching engagement device to the engaged state after the differential rotation suppression control portion 88 determines that the differential rotation speed ΔNc is equal to or less than the second predetermined value.

Figure 19:
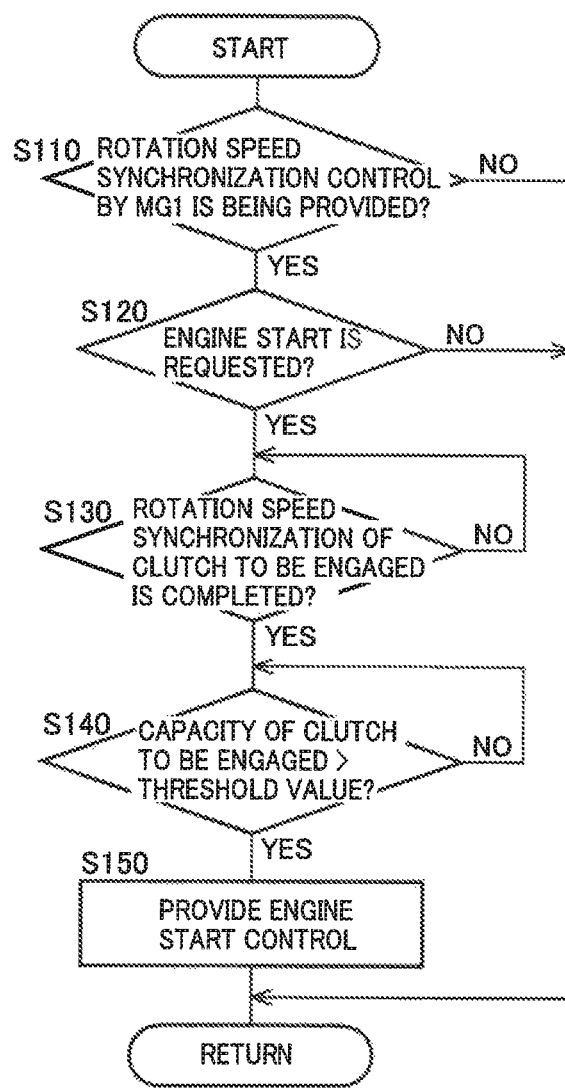
FIG. 19 is a flowchart for explaining a main portion of the control operation of the electronic control device, i.e., the control operation in the case that the start of the engine is requested during provision of rotation speed synchronization control by the first rotating machine.
Figure 20:
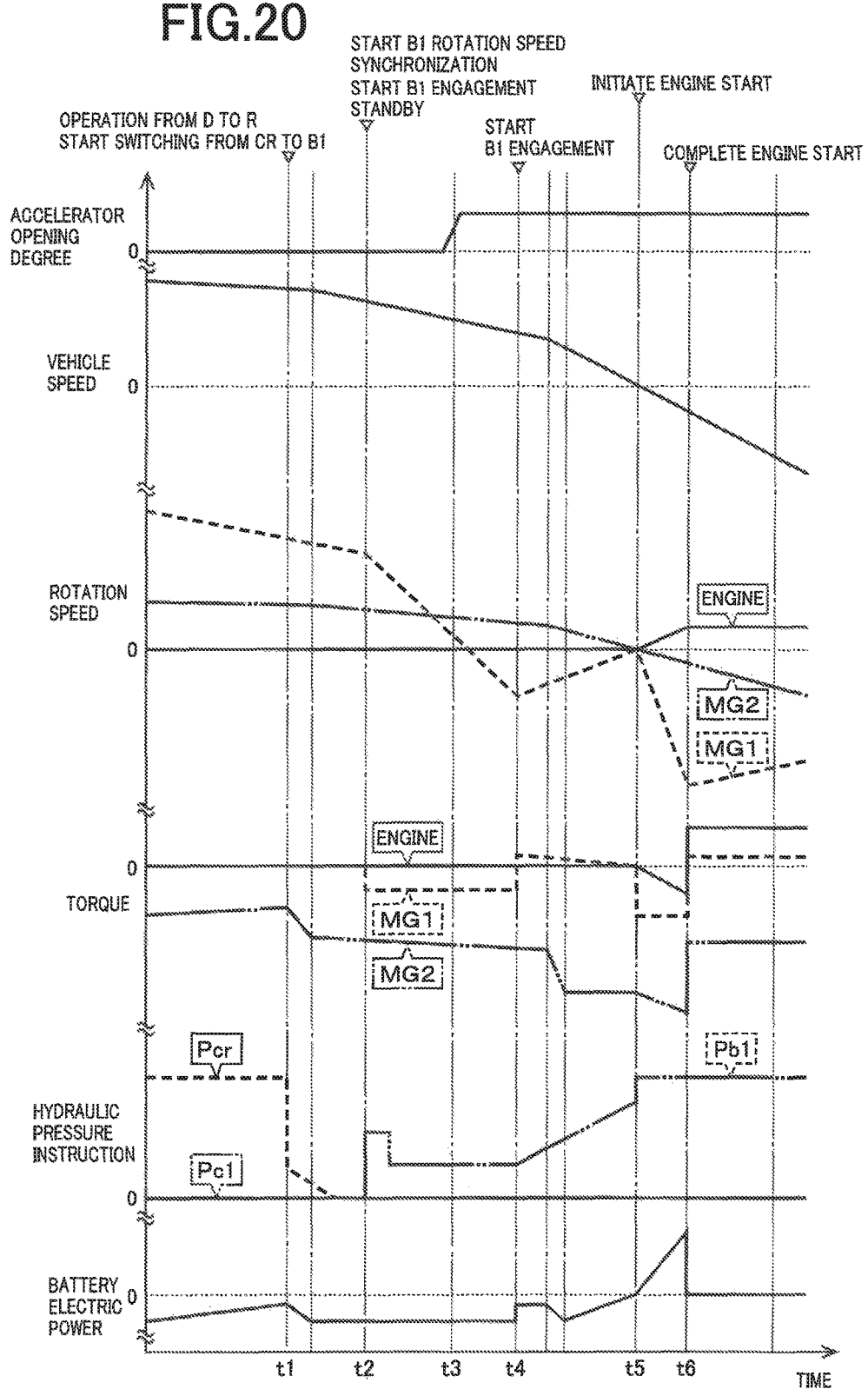
FIG. 20 is a diagram of an example of a time chart when the control operation shown in the flowchart of FIG. 19 is performed.

FIG. 19 is a flowchart for explaining a main portion of the control operation of the electronic control device 80, i.e., the control operation in the case that the start of the engine 12 is requested during provision of the rotation speed synchronization control by the first rotating machine MG1, and the control operation is repeatedly performed during the EV running, for example. FIG. 20 is a diagram of an example of a time chart when the control operation shown in the flowchart of FIG. 19 is performed.

In FIG. 19, first, at S110 corresponding to the function of the differential rotation suppression control portion 88, it is determined whether the rotation speed synchronization control by the first rotating machine MG1 is being provided. If the determination of S110 is negative, this routine is terminated. If the determination of S110 is positive, it is determined at S120 corresponding to the function of the hybrid control portion 82 whether the start of the engine 12 is requested. If the determination of S120 is negative, this routine is terminated. If the determination of S120 is affirmative, it is determined at S130 corresponding to the function of the differential rotation suppression control portion 88 whether the synchronization of rotation speed in the engagement-switching engagement device is completed. In this synchronization completion determination, the second predetermined value may be used instead of the predetermined value. If the determination of S130 is negative, this S130 is executed again. If the determination of S130 is affirmative, it is determined at S140 corresponding to the function of the engagement control portion 87 whether the hydraulic pressure of the engagement-switching engagement device is sufficiently increased, based on whether the hydraulic pressure of the engagement-switching engagement device is higher than the predetermined engagement pressure. If the determination of S140 is negative, this S140 is executed again. If the determination of S140 is affirmative, the engine start control is provided at S150 corresponding to the function of the start control portion 86.

FIG. 20 shows a scene of switching from the forward running in the U/DHV mode to the O/DHV mode reverse rotation input (backward) during deceleration in the EV running while regeneration is performed by the second rotating machine MG2 alone. This scene corresponds to switching of the shift lever operation position POSsh from the forward running position D to the reverse running position R by a driver operation during deceleration with the accelerator off within the region indicated by the dashed-dotted line of FIG. 14, for example. In the case of switching to the reverse running position R even though the vehicle speed V is a positive value, switching to the O/DHV mode reverse rotation input (backward) can be achieved without completely stopping the vehicle 10 as long as the vehicle speed is equal to or less than a predefined determination vehicle speed. In FIG. 20, because switching from the forward running in the U/DHV mode to the O/DHV mode reverse rotation input (backward) is determined in association with the operation of the shift lever from the forward running position D to the reverse running position R during reduction of the vehicle speed V, it is determined to start switching the engagement device put into the engaged state from the clutch CR to the brake B1 (see time t1). In this way, the switching in this case is generated by switching of the driver's intention to move forward and backward. Due to this determination, the hydraulic pressure value is lowered in the hydraulic pressure instruction for the clutch CR serving as the release-switching engagement device (see time t1 to time t2). Subsequently, when it is determined that the torque capacity of the clutch CR is sufficiently lowered, the synchronization of rotation speed is started in the brake B1 serving as the engagement-switching engagement device (see time t2). The synchronization of rotation speed is performed through the control of the MG1 torque Tg (see time t2 to time t4). During the rotation speed synchronization control by the first rotating machine MG1, the standby control of the brake B1 is started in time for completion of the rotation speed synchronization control (see time t2). When it is determined that the synchronization of the rotation speed in the brake B1 is completed, the hydraulic pressure value of the hydraulic pressure instruction for the brake B1 is increased, and the engagement of the brake B1 is started so that the torque capacity of the brake B is generated (see time t4). The rotation speed synchronization control by the first rotating machine MG1 is provided even during the transition while the torque capacity of the brake B1 is increased (see time t4 to time t5). As a result, the engagement shock is further suppressed or the engagement shock is more reliably avoided. In this example, an accelerator-on operation is performed during the rotation speed synchronization control by the first rotating machine MG1 (see time t3). If a request for the start of the engine 12 is made in accordance with the accelerator-on operation, the engine is supposed to be started immediately, however, since the state transition of switching from the forward running in the U/DHV mode to the O/DHV mode reverse rotation input (backward) is not completed, the engine start is delayed. When the torque capacity of the brake B1 is set to a sufficient value, the hydraulic pressure value of the hydraulic pressure instruction is set to the maximum hydraulic pressure, and the state transition for switching from the forward running in the U/DHV mode to the O/DHV mode reverse rotation input (backward) is terminated (see time t5). Subsequently, the engine start control is started (see time t5). The engine rotation speed Ne is raised by the first rotating machine MG1 for ignition, and the engine start is completed (see time t6).

As described above, according to this example, since the start of the engine 12 is delayed until both the rotation speed synchronization control by the first rotating machine MG1 and the engagement control of the engagement-switching engagement device are completed, and the start of the engine 12 is initiated after the completion of these controls, an increase in the engagement shock can be avoided.

According to this example, if the start of the engine 12 is requested during the rotation speed synchronization control by the first rotating machine MG1, the engagement-switching engagement device is put into the engaged state after the differential rotation speed ΔNc in the engagement-switching engagement device is made equal to or less than the second predetermined value (>the predetermined value) and, therefore, as compared to the case of putting the engagement-switching engagement device into the engaged state after the differential rotation speed ΔNc is made equal to or less than the predetermined value, the start of the engine 12 is advanced although the engagement shock is slightly increased. Therefore, both the engine start delay and the engagement shock can be suppressed.

Example 3

Figure 21:
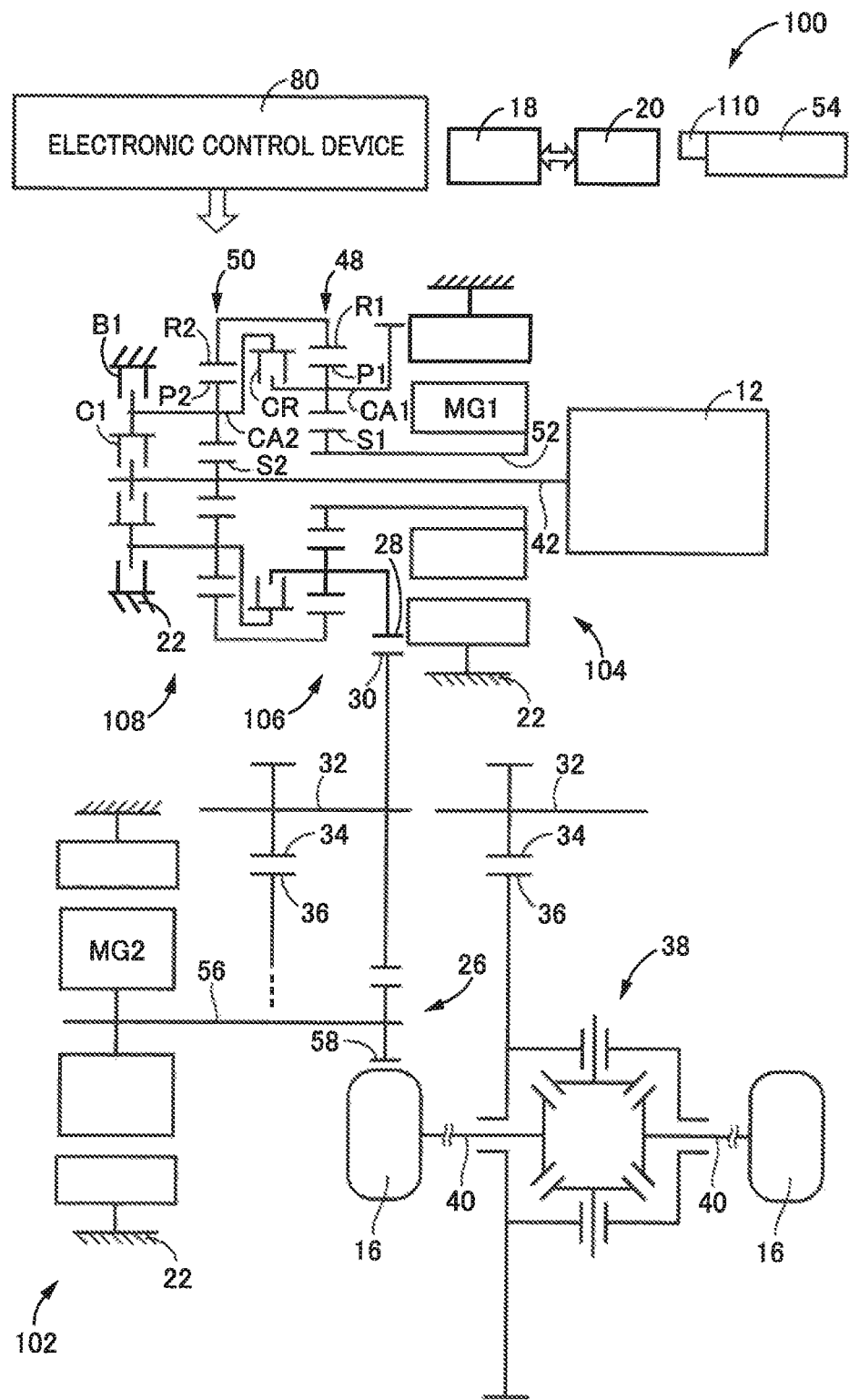
FIG. 21 is a diagram for explaining a general configuration of portions related to running of a vehicle to which the present invention is applied, and is also a diagram for explaining the vehicle different from the vehicle shown in FIG. 1.

FIG. 21 is a diagram for explaining a general configuration of portions related to running of a vehicle 100 to which the present invention is applied, and is also a diagram for explaining a main portion of a control system for controlling the portions. In FIG. 21, the vehicle 100 is a hybrid vehicle including the engine 12, the first rotating machine MG1, and the second rotating machine MG2 that may serve as drive power sources for running, as well as a power transmission device 102 having the first rotating machine MG1 and the second rotating machine MG2, and the drive wheels 16.

The power transmission device 102 is disposed on a power transmission path between the engine 12 and the drive wheels 16. The power transmission device 102 includes, in the case 22, a first power transmission portion 104, the second power transmission portion 26, the driven gear 30 meshing with the drive gear 28 that is an output rotating member of the first power transmission portion 104, the driven shaft 32 fixing the driven gear 30 in a relatively non-rotatable manner, the final gear 34 (the final gear 34 having a smaller diameter than the driven gear 30) fixed to the driven shaft 32 in a relatively non-rotatable manner, the differential gear 38 meshing with the final gear 34 via the differential ring gear 36, etc. The power transmission device 102 includes the axles 40 etc. coupled to the differential gear 38.

The first power transmission portion 104 is disposed coaxially with the input shaft 42 that is an input rotating member of the first power transmission portion 104 and includes a first differential portion 106, a second differential portion 108, and the clutch CR. The first differential portion 106 includes the first planetary gear mechanism 48 and the first rotating machine MG1. The second differential portion 108 includes the second planetary gear mechanism 50, the clutch C1, and the brake B1.

In the first differential portion 106, the first ring gear R1 is the first rotating element RE1 acting as an input element coupled to an output rotating member of the second differential portion 108 (i.e., the second ring gear R2 of the second planetary gear mechanism 50) and functions as an input rotating member of the first differential portion 106. The first sun gear S1 is integrally coupled to the rotor shaft 52 of the first rotating machine MG1 and is the second rotating element RE2 acting as a reaction force element to which the first rotating machine MG1 is coupled in a power transmittable manner. The first carrier CA1 is integrally coupled to the drive gear 28, is the third rotating element RE3 acting as the output element coupled to the drive wheels 16, and functions as an output rotating member of the first differential portion 106.

In the second differential portion 108, the second sun gear S2 is the fourth rotating element RE4 integrally coupled to the input shaft 42 and coupled via the input shaft 42 to the engine 12 in a power transmittable manner and functions as an input rotating member of the second differential portion 108. The second carrier CA2 is the fifth rotating element RE5 selectively coupled via the brake B1 to the case 22. The second ring gear R2 is the sixth rotating element RE6 coupled to the input rotating member of the first differential portion 106 (i.e., the first ring gear R1 of the first planetary gear mechanism 48) and functions as the output rotating member of the second differential portion 108. The second sun gear S2 and the second carrier CA2 are selectively coupled via the clutch C1. The first carrier C1 and the second carrier CA2 are selectively coupled via the clutch CR. Therefore, the clutch C1 is the first engagement device selectively coupling the fourth rotating element RE4 and the fifth rotating element RE5. The brake B1 is the second engagement device selectively coupling the fifth rotating element RE5 to the case 22 that is the non-rotatable member.

The clutch CR is the third engagement device selectively coupling the third rotating element RE3 and the fifth rotating element RE5.

The vehicle 100 includes an electric oil pump 110 (also referred to as an EOP 110), and the EOP 110 supplies the power transmission device 102 with the hydraulic fluid (oil) oil used for switching of the respective operating states of the clutch C1, the brake B1, and the clutch CR, lubrication of the portions, and cooling of the portions. A mechanical oil pump may be included instead of the EOP 110.

In a state in which a differential motion is permitted, the first planetary gear mechanism 48 in the first differential portion 106 can function as a power division mechanism dividing the power of the engine 12 input to the first ring gear R1 between the first rotating machine MG1 and the first carrier CA1. Therefore, by taking the reaction force of the engine torque Te input to the first ring gear R1 by the first rotating machine MG1, the vehicle 100 can perform the engine running with a direct torque mechanically transmitted to the first carrier CA1 and the MG2 torque Tm from the second rotating machine MG2 driven by the electric power generated by the first rotating machine MG1 from the power divided for the first rotating machine MG1. Therefore, the first differential portion 106 functions as a known electric differential portion (electric continuously variable transmission).

By switching the operating states of the clutch C1 and the brake B1, the second differential portion 108 can form four states, which are a direct coupling state, a reverse-rotation speed change state of the engine 12, a neutral state, and an internal lock state.

The first power transmission portion 104 can constitute an electric continuously variable transmission operating at a power split ratio different from a power split ratio of the first differential portion 106. In particular, when the first ring gear R1 (the first rotating element RE1) and the second ring gear R2 (the sixth rotating element RE6) are coupled and, additionally, the first carrier CA1 (the third rotating element RE3) and the second carrier CA2 (the fifth rotating element RE5) are coupled by putting the clutch CR into the engaged state, the first power transmission portion 104 can allow the first differential portion 106 and the second differential portion 108 to constitute one differential mechanism and can cause the whole of the first differential portion 106 and the second differential portion 108 to function as the electric continuously variable transmission operating at a power split ratio different from the power split ratio of the first differential portion 106 alone.

The second differential portion 108 forming the four states described above and the first differential portion 106 are coupled in the first power transmission portion 104, and the vehicle 100 can achieve a plurality of running modes in combination with switching of the operating state of the clutch CR.

In the first power transmission portion 104 configured as described above, the power of the engine 12 and the power of the first rotating machine MG1 are transmitted from the drive gear 28 to the driven gear 30. Therefore, the engine 12 and the first rotating machine MG1 are coupled via the first power transmission portion 104 to the drive wheels 16 in a power transmittable manner.

The second power transmission portion 26 includes the second rotating machine MG2, the rotor shaft 56 of the second rotating machine MG2 disposed separately from the input shaft 42 and parallel to the input shaft 42, and the reduction gear 58 (the reduction gear 58 having a smaller diameter than the driven gear 30) meshing with the driven gear 30 and coupled to the rotor shaft 56. As a result, in the second power transmission portion 26, the power of the second rotating machine MG2 is transmitted to the driven gear 30 without via the first power transmission portion 104. Therefore, the second rotating machine MG2 is coupled to the drive wheels 16 in a power transmittable manner without via the first power transmission portion 104.

The power transmission device 102 configured as described above is preferably used for an FF type vehicle. In the power transmission device 102, the power of the engine 12, the power of the first rotating machine MG1, and the power of the second rotating machine MG2 are transmitted to the driven gear 30, and are transmitted from the driven gear 30, sequentially through the final gear 34, the differential gear 38, the axles 40, etc. to the drive wheels 16. The vehicle 100 has the engine 12, the first power transmission portion 104, and the first rotating machine MG1 arranged on an axis different from that of the second rotating machine MG2 so that the axial length is shortened. A gear pair of the driven gear 30 and the reduction gear 58 can make the speed reduction ratio of the second rotating machine MG2 larger. Additionally, the power transmission device 102 is advantageous as compared to the power transmission device 14 of Example 1 described above in that only two axes are required as the shafts on the inner circumferential side of the first rotating machine MG1.

The vehicle 100 includes the electronic control device 80 including a control device controlling the portions related to running. The vehicle 100 also includes the electric power control unit 18, the battery unit 20, the hydraulic control circuit 54, the EOP 110, etc.

The running mode executable in the vehicle 100 will be described with reference to FIGS. 22 and 23 to 30. FIG. 22 is a chart of the operating states of the clutch C1, the brake B1, and the clutch CR in the running modes. Circles, blanks, triangles, "G", and "M" in the chart of FIG. 22 are the same as those of FIG. 2 of Example 1 described above and therefore will not be described. As shown in FIG. 22, the vehicle 100 can selectively achieve the EV running mode and the HV running mode as the running mode.

FIGS. 23 to 30 are collinear charts capable of relatively representing the rotation speeds of the rotating elements RE1 to RE6 in each of the first planetary gear mechanism 48 and the second planetary gear mechanism 50. In these collinear charts, vertical lines Y1 to Y4 indicative of the rotation speeds of the rotating elements are arranged in order from the left on the planes of the figures; the vertical line Y1 indicates the rotation speed of the first sun gear S1 that is the second rotating element RE2 coupled to the first rotating machine MG1; the vertical line Y2 indicates the rotation speed of the second sun gear S2 that is the fourth rotating element RE4 coupled to the engine 12; the vertical line Y3 indicates the rotation speed of the first carrier CA1 that is the third rotating element RE3 coupled to the drive gear 28 and the rotation speed of the second carrier CA2 that is the fifth rotating element RE5 selectively coupled to the case 22 via the brake B1; and the vertical line Y4 indicates the rotation speeds of the first ring gear R1 that is the first rotating element RE1 and the second ring gear R2 that is the sixth rotating element RE6, which are coupled to each other. The various marks (□), (○), (◇), (●), and (♦), arrows, the clutch C1, solid lines, and broken lines are the same as those of FIGS. 3 to 10 of Example 1 described above and therefore will not be described.

Figure 23:
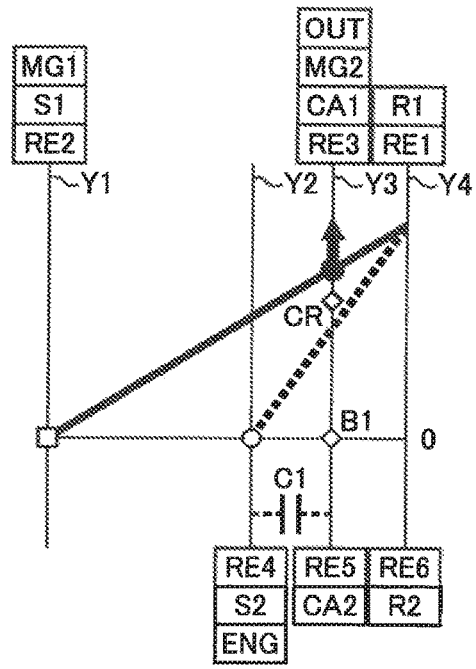
FIG. 23 is a collinear chart at the time of the single drive EV mode in the vehicle shown in FIG. 21.

FIG. 23 is a collinear chart at the time of the single drive EV mode. As shown in FIG. 22, the single drive EV mode is achieved when the clutch C1, the brake B1, and the clutch CR are all in the released state. In the single drive EV mode, the clutch C1 and the brake B1 are released to permit the differential motion of the second planetary gear mechanism 50, and the second differential portion 108 is put into the neutral state. The hybrid control portion 82 stops the operation of the engine 12 and causes the second rotating machine MG2 to output the MG2 torque Tm for running. FIG. 23 shows the case of forward movement when the second rotating machine MG2 outputs a positive torque by positive rotation (i.e., in the rotation direction of the first carrier CA1 at the time of forward movement of the vehicle 100). At the time of backward movement, the second rotating machine MG2 is rotated backward with respect to the time of forward movement. During running of the vehicle, the first carrier CA1 coupled to the drive gear 28 is rotated in conjunction with the rotation of the second rotating machine MG2 (having the same meaning as the rotation of the drive wheels 16 in this case). In the single drive EV mode, additionally, since the clutch CR is released, each of the engine 12 and the first rotating machine MG1 is not corotated so that the engine rotation speed Ne and the MG1 rotation speed Ng can be made zero. As a result, a drag loss in each of the engine 12 and the first rotating machine MG1 can be reduced to improve a specific power consumption (i.e., to suppress the electric power consumption).

When the engine braking is used in combination during running in the single drive EV mode, as shown in FIG. 22, the clutch C1 or the clutch CR is engaged (see combination with engine brake in the single drive EV mode). When the clutch C1 or the clutch CR is engaged, the engine 12 is put into the corotation state. In this state, the engine rotation speed Ne can be increased by the first rotating machine MG1 to put the engine braking into action. Even in the corotation state of the engine 12, the engine rotation speed Ne can be made zero and, in this case, the EV running can be performed without putting the engine braking into action. The engine braking can be put into action also by engaging the brake B1.

Figure 24:
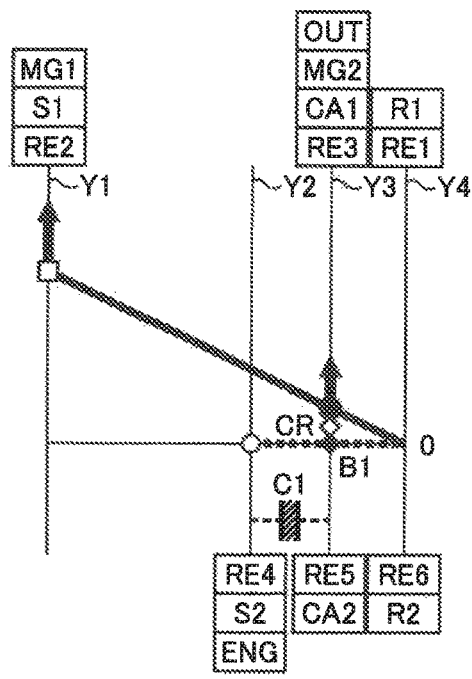
FIG. 24 is a collinear chart at the time of the double drive EV mode in the vehicle shown in FIG. 21.

FIG. 24 is a collinear chart at the time of the double drive EV mode. As shown in FIG. 22, the double drive EV mode is achieved when the clutch C1 and the brake B1 are in the engaged state and the clutch CR is in the released state. In the double drive EV mode, the clutch C1 and the brake B1 are engaged to restrict the differential motion of the second planetary gear mechanism 50, and the rotation of the second carrier CA2 is stopped. Therefore, the rotation of all the rotating elements is stopped in the second planetary gear mechanism 50, and the second differential portion 108 is put into the internal lock state. As a result, the engine 12 is put into the stop state with zero rotation, and the first ring gear R1 coupled to the second ring gear R2 is also fixed at zero rotation. When the first ring gear R1 is fixed in a non-rotatable manner, the reaction torque of the MG1 torque Tg is taken by the first ring gear R1, so that the torque based on the MG1 torque Tg can mechanically be output from the first carrier CA1 and transmitted to the drive wheels 16. The hybrid control portion 82 stops the operation of the engine 12 and causes the first rotating machine MG1 and the second rotating machine MG2 to output the MG1 torque Tg and the MG2 torque Tm, respectively, for running. FIG. 24 shows the case of forward movement when both the first rotating machine MG1 and the second rotating machine MG2 output a positive torque by positive rotation. At the time of backward movement, the first rotating machine MG1 and the second rotating machine MG2 are rotated backward with respect to the time of forward movement.

Figure 25:
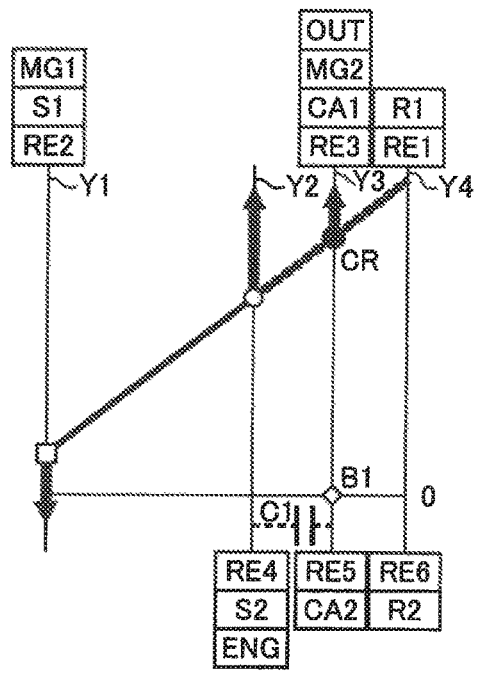
FIG. 25 is a collinear chart at the time of the O/DHV mode of the HV running mode in the vehicle shown in FIG. 21.

FIG. 25 is a collinear chart at the time of the O/DHV mode of the HV running mode. As shown in FIG. 22, the O/DHV mode is achieved when the clutch C1 and the brake B1 are in the released state and the clutch CR is in the engaged state. In the O/DHV mode, the clutch CR is engaged, and one differential mechanism is made up of the first differential portion 106 and the second differential portion 108. Additionally, in the O/DHV mode, the clutch C1 and the brake B1 are released, and the whole of the first differential portion 106 and the second differential portion 108 constitute the electric continuously variable transmission operating at a power split ratio different from the power split ratio of the first differential portion 106 alone. As a result, the first power transmission portion 104 can divide the power of the engine 12 input to the second sun gear S2 between the first sun gear S1 and the first carrier CA1. Therefore, in the first power transmission portion 104, the reaction force of the engine torque Te input to the second sun gear S2 is taken by the first rotating machine MG1, so that the engine direct torque is mechanically transmitted to the first carrier CA1, and the electric power generated by the first rotating machine MG1 from the power of the engine 12 divided to the first rotating machine MG1 is transmitted through a predetermined electric path to the second rotating machine MG2. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 25 shows the case of forward movement when the second rotating machine MG2 outputs a positive torque by positive rotation. At the time of backward movement, the second rotating machine MG2 is rotated backward with respect to the time of forward movement. At the time of the backward movement, engine normal rotation input is performed such that the rotation and the torque of the engine 12 are directly input as positive values to the configuration achieving the function of the electric continuously variable transmission.

Figure 26:
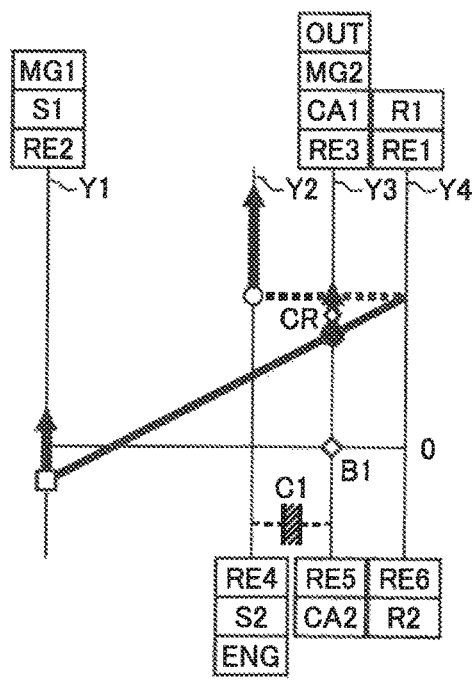
FIG. 26 is a collinear chart in forward running at the time of the U/DHV mode of the HV running mode in the vehicle shown in FIG. 21.

FIG. 26 is a collinear chart in forward running at the time of the U/DHV mode of the HV running mode. As shown in FIG. 22, the forward running in the U/DHV mode (hereinafter referred to as the U/DHV mode (forward)) is achieved when the clutch C1 is in the engaged state and the brake B1 and the clutch CR are in the released state. In the U/DHV mode (forward), since the clutch C1 is engaged and the brake B1 is released so that the second differential portion 108 is put into the direct coupling state, the power of the engine 12 is directly transmitted to the first ring gear R1 coupled to the second ring gear R2. Additionally, in the U/DHV mode (forward), the clutch CR is released, and the electric continuously variable transmission is made up of the first differential portion 106 alone. As a result, the first power transmission portion 104 can divide the power of the engine 12 input to the first ring gear R1 between the first sun gear S1 and the first carrier CA1. Therefore, in the first power transmission portion 104, the reaction force of the engine torque Te input to the first ring gear R1 is taken by the first rotating machine MG1, so that the engine direct torque is mechanically transmitted to the first carrier CA1, and the electric power generated by the first rotating machine MG1 from the power of the engine 12 divided to the first rotating machine MG1 is transmitted through a predetermined electric path to the second rotating machine MG2. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 26 shows the case of forward running when the second rotating machine MG2 outputs a positive torque by positive rotation.

Figure 27:
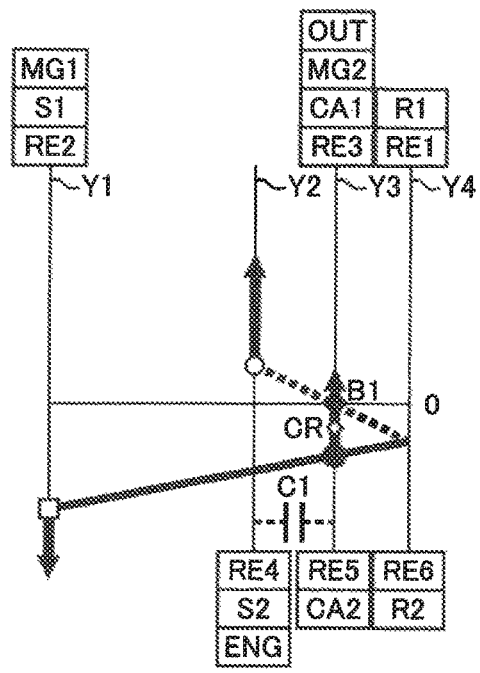
FIG. 27 is a collinear chart in backward running at the time of the U/DHV mode of the HV running mode in the vehicle shown in FIG. 21 and shows the case of engine reverse rotation input.

FIG. 27 is a collinear chart in backward running at the time of the U/DHV mode of the HV running mode and shows the case of engine reverse rotation input performed such that the rotation and the torque of the engine 12 are reversed to negative values and input to the configuration achieving the function of the electric continuously variable transmission. As shown in FIG. 22, the backward running in the engine reverse rotation input of the U/DHV mode (hereinafter referred to as the U/DHV mode reverse rotation input (backward)) is achieved when the brake B1 is in the engaged state and the clutch C1 and the clutch CR are in the released state. In the U/DHV mode reverse rotation input (backward), since the clutch C1 is released and the brake B1 is engaged so that the second differential portion 108 is put into the reverse-rotation speed change state of the engine 12, the power of the engine 12 is transmitted to the first ring gear R1 coupled to the second ring gear R2 in negative rotation and as a negative torque. Additionally, in the U/DHV mode reverse rotation input (backward), the clutch CR is released and the electric continuously variable transmission is made up of the first differential portion 106 alone. As a result, the first power transmission portion 104 can divide the power of the engine 12 reversed and input to the first ring gear R1 between the first sun gear S1 and the first carrier CA1. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. In the example shown in FIG. 27, since the first rotating machine MG1 outputting the negative torque is located in the negative rotation region, the second rotating machine MG2 outputs a positive torque by negative rotation so as to generate an electric power used for power running of the first rotating machine MG1; however, the engine direct torque (not shown) generated as the negative torque has an absolute value larger than that of the MG2 torque Tm, so that the reverse running can be performed.

Figure 28:
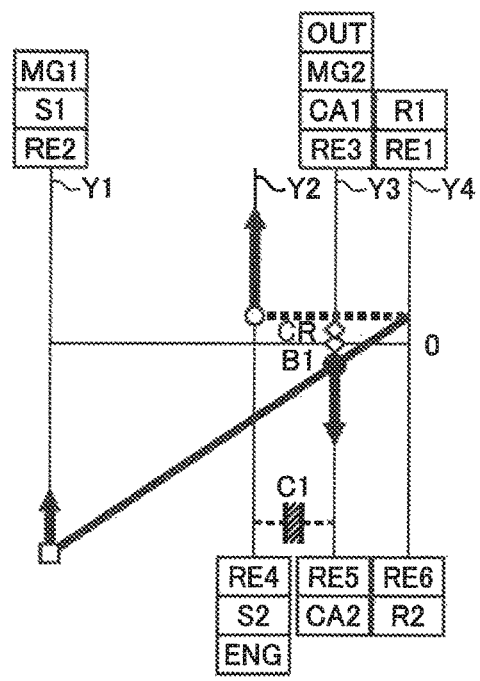
FIG. 28 is a collinear chart in backward running at the time of the U/DHV mode of the HV running mode in the vehicle shown in FIG. 21 and shows the case of engine normal rotation input.

FIG. 28 is a collinear chart in backward running at the time of the U/DHV mode of the HV running mode and shows the case of the engine normal rotation input. As shown in FIG. 22, the backward running in the engine normal rotation input of the U/DHV mode (hereinafter referred to as the U/DHV mode normal rotation input (backward)) is achieved when the clutch C1 is in the engaged state and the brake B1 and the clutch CR are in the released state. In the U/DHV mode normal rotation input (backward), since the clutch C1 is engaged and the brake B1 is released so that the second differential portion 108 is put into the direct coupling state, the power of the engine 12 is directly transmitted to the first ring gear R1 coupled to the second ring gear R2. Additionally, in the U/DHV mode normal rotation input (backward), the clutch CR is released and the electric continuously variable transmission is made up of the first differential portion 106 alone. As a result, the first power transmission portion 104 can divide the power of the engine 12 input to the first ring gear R1 between the first sun gear S1 and the first carrier CA1. The hybrid control portion 82 allows the engine 12 to operate (work), causes the electric generation of the first rotating machine MG1 to output the MG1 torque Tg acting as the reaction torque to the engine torque Te, and causes the second rotating machine MG2 to output the MG2 torque Tm by using the electric power generated by the first rotating machine MG1. FIG. 28 shows the case of backward running when the second rotating machine MG2 outputs a negative torque by negative rotation.

As shown in the description with reference to FIGS. 25 to 28, the O/DHV mode and the U/DHV mode are different in the rotating element when the power of the engine 12 is input to the configuration achieving the function of the electric continuously variable transmission, and are also different in the power split ratio when allowing the first power transmission portion 104 to act as the electric continuously variable transmission. Therefore, the ratios of the output torques and the rotation speeds of the rotating machines MG1, MG2 to the engine 12 can be changed between the O/DHV mode and the U/DHV mode. The operating state of the clutch CR is switched so as to change the ratios of the output torques and the rotation speeds of the rotating machines MG1, MG2 to the engine 12 during the engine running.

The engine direct torque in the O/DHV mode is reduced with respect to the engine torque Te. On the other hand, the engine direct torque in the U/DHV mode (forward) is increased with respect to the engine torque Te. In this example, the first differential portion 106 solely constitutes the electric continuously variable transmission in the U/DHV mode (see FIG. 26). Therefore, in the first differential portion 106, when the clutch C1 is in the engaged state and the clutch CR is in the released state so that the differential state is controlled through control of the operational state of the first rotating machine MG1, a torque increased as compared to the engine torque Te is mechanically transmitted to the first carrier CA1.

In the state of so-called mechanical point in which the MG1 rotation speed Ng is made zero and the power of the engine 12 is entirely mechanically transmitted to the first carrier CA1 without passing through the electric path (the electric power transmission path that is the electric path related to giving/receiving of the electric power of the first rotating machine MG1 and the second rotating machine MG2), the O/DHV mode is the case of the overdrive state in which the rotation of the engine 12 is increased in speed and output from the first carrier CA1, and the U/DHV mode is the case of the underdrive state in which the rotation of the engine 12 is reduced in speed and output from the first carrier CA1.

Figure 29:
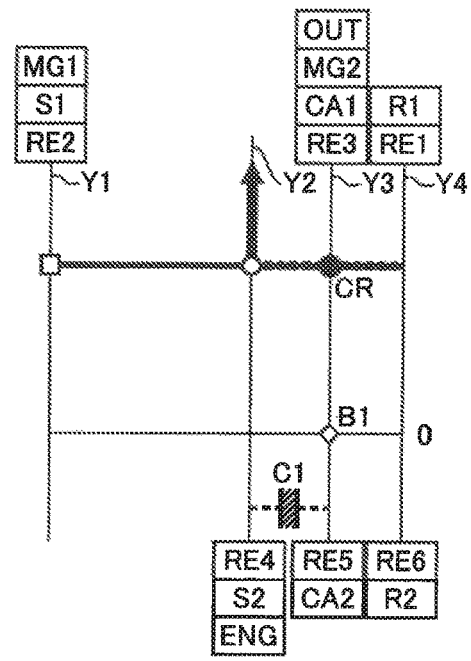
FIG. 29 is a collinear chart at the time of the fixed stage mode of the HV running mode in the vehicle shown in FIG. 21 and shows the case of direct coupling when rotating elements of a first differential portion and a second differential portion are integrally rotated.

FIG. 29 is a collinear chart at the time of the fixed stage mode of the HV running mode and shows the case of direct coupling when the rotating elements of the first differential portion 106 and the second differential portion 108 are integrally rotated. As shown in FIG. 22, the direct coupling of the fixed stage mode (hereinafter referred to as the direct coupling fixed stage mode) is achieved when the clutch C1 and the clutch CR are in the engaged state and the brake B1 is in the released state. In the direct coupling fixed stage mode, the clutch C1 is engaged and the brake B1 is released, and the second differential portion 108 is put into the direct coupling state. Additionally, in the direct coupling fixed stage mode, the clutch CR is engaged, and the rotating elements of the first differential portion 106 and the second differential portion 108 are integrally rotated. As a result, the first power transmission portion 104 can output the power of the engine 12 directly from the first carrier CA1. The hybrid control portion 82 causes the engine 12 to output the engine torque Te for running. In this direct coupling fixed stage mode, the first rotating machine MG1 can be driven by the electric power from the battery unit 20 to output the power of the first rotating machine MG1 directly from the first carrier CA1. In this direct coupling fixed stage mode, the second rotating machine MG2 can be driven by the electric power from the battery unit 20 to transmit the power of the second rotating machine MG2 to the drive wheels 16. Therefore, in addition to causing the output of the engine torque Te, the hybrid control portion 82 may cause at least one rotating machine out of the first rotating machine MG1 and the second rotating machine MG2 to output a torque for running. Therefore, in the direct coupling fixed stage mode, the vehicle 100 may be driven only by the engine 12, or torque assist may be performed by the first rotating machine MG1 and/or the second rotating machine MG2.

Figure 30:
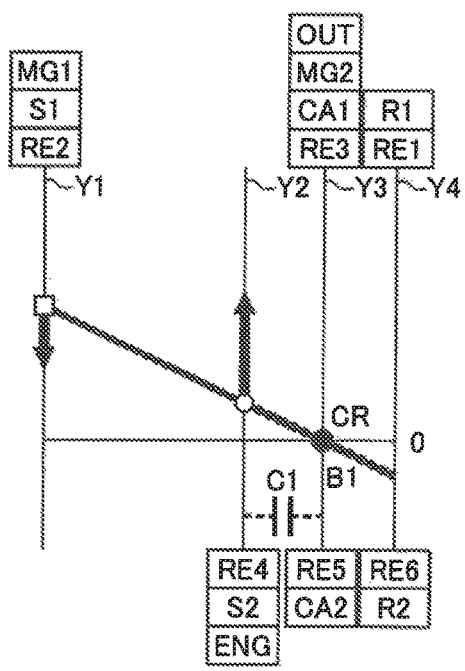
FIG. 30 is a collinear chart at the time of the fixed stage mode of the HV running mode in the vehicle shown in FIG. 21 and shows the case of the output shaft fixation when a first carrier is non-rotatably fixed.

FIG. 30 is a collinear chart at the time of the fixed stage mode of the HV running mode and shows the case of the output shaft fixation when the first carrier CA1 is non-rotatably fixed. As shown in FIG. 22, the output shaft fixation of the fixed stage mode (hereinafter referred to as the output shaft fixed stage mode) is achieved when the brake B and the clutch CR are in the engaged state and the clutch C1 is in the released state. In the output shaft fixed stage mode, the clutch CR is engaged, and the first differential portion 106 and the second differential portion 108 constitute one differential mechanism. Additionally, in the output shaft fixed stage mode, the brake B1 is engaged and the clutch C1 is released, so that the first carrier CA1 is non-rotatably fixed. As a result, in the first power transmission portion 104, the reaction force of the power of the engine 12 input to the second sun gear S2 can be taken by the first rotating machine MG1. Therefore, in the output shaft fixed stage mode, the battery unit 20 can be charged with the electric power generated by the first rotating machine MG1 from the power of the engine 12. The hybrid control portion 82 allows the engine 12 to operate (work) and causes the electric generation of the first rotating machine MG1 to take the reaction force to the power of the engine 12 so as to charge the battery unit 20 through the electric power control unit 18 with the electric power generated by the first rotating machine MG1. Since the first carrier CA1 is non-rotatably fixed, this output shaft fixed stage mode is a mode of exclusively charging the battery unit 20 during stop of the vehicle 100. As shown in the description with reference to FIGS. 29 and 30, the clutch CR is engaged in the direct coupling fixed stage mode and the output shaft fixed stage mode of the HV running mode.

Both the U/DHV mode and the O/DHV mode allow the first power transmission portion 104 to function as the electric continuously variable transmission. When the speed reduction ratio I of the first power transmission portion 104 is "1", this is the state equivalent to the state of the direct coupling fixed stage mode (see FIG. 29) in which the clutch C1 and the clutch CR are both engaged. Therefore, preferably, the hybrid control portion 82 switches between the U/DHV mode (forward) in which the clutch C1 is engaged and the O/DHV mode in which the clutch CR is engaged, by switching the operating states of the clutch C1 and the clutch CR at the time of the synchronized state when the speed reduction ratio I is "1".

By applying the vehicle speed V and the vehicle load (e.g., the required drive torque) to the running mode switching map as shown in FIG. 14 or 15 of Example 1 described above, the hybrid control portion 82 determines which running mode is the running mode to be established. When the determined running mode is the current running mode, the hybrid control portion 82 keeps the current running mode established as it is and, on the other hand, when the determined running mode is different from the current running mode, the hybrid control portion 82 establishes the determined running mode instead of the current running mode.

The power transmission switching portion 84 controls the respective engagement operations (operating states) of the clutch C1, the brake B1, and the clutch CR based on the running mode established by the hybrid control portion 82. The power transmission switching portion 84 outputs to the hydraulic control circuit 54 the hydraulic control command signal Sp engaging and/or releasing each of the clutch C1, the brake B1, and the clutch CR such that the power can be transmitted for running in the running mode established by the hybrid control portion 82.

Figure 31:
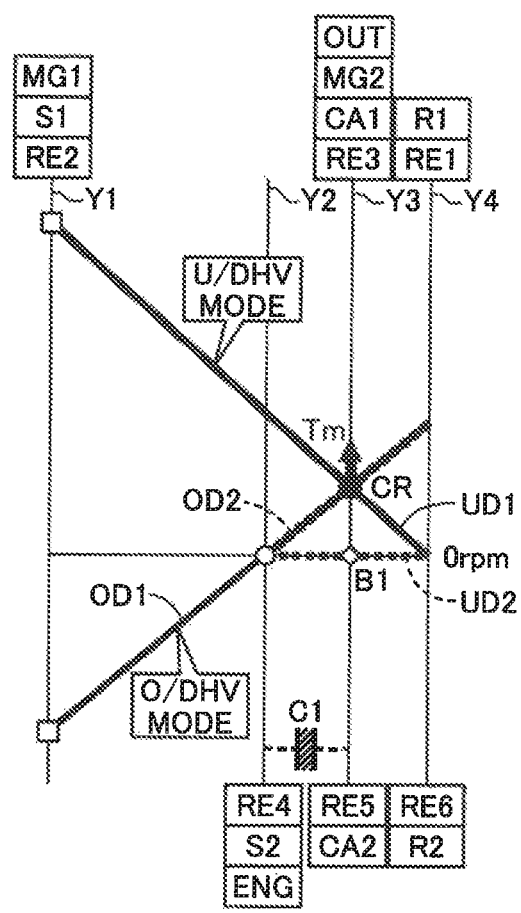
FIG. 31 is a diagram for explaining an example of states before and after switching when the O/DHV mode and the U/DHV mode are switched during running of the vehicle shown in FIG. 21 in the single drive EV mode in the rotation stop state of the engine.

FIG. 31 is a diagram using the same collinear chart as the collinear charts of FIGS. 23 to 30 for explaining an example of states before and after switching when the O/DHV mode and the U/DHV mode are switched during running in the single drive EV mode in the rotation stop state of the engine 12. In FIG. 31, since the switching from the O/DHV mode to the U/DHV mode has occurred during running when the power running is performed by the second rotating machine MG2 alone while the engine 12 is in the rotation stop state, the state of a solid line OD1 and a broken line OD2 corresponding to the O/DHV mode with the clutch CR put into the engaged state is switched to the state of a solid line UD1 and a broken line UD2 corresponding to the U/DHV mode with the clutch C1 put into the engaged state. In this case, when the clutch CR is switched to the released state and the clutch C1 is switched to the engaged state in the state corresponding to the O/DHV mode, the engine rotation speed Ne may be generated in the positive rotation due to corotation. Additionally, the first rotating machine MG1 is rotated in the positive direction due to a torque capacity (i.e., clutch torque) Tc1 of the clutch C1 (hereinafter referred to as a C1 torque Tc1). In this way, the engine 12 and the first rotating machine MG1 having an inertia rotate and cause a shock at the drive wheels 16. Such an engagement shock associated with the engagement of the clutch C1 may increase when the differential rotation speed $\Delta Nc$ of the clutch C1 is larger. It is desirable that the switching between the O/DHV mode and the U/DHV mode is performed without generating such an engagement shock. Also in the switching from the U/DHV mode to the O/DHV mode, when the clutch CR is switched to the engaged state, the engine rotation speed Ne may be generated in the positive rotation due to corotation.

In this regard, in the vehicle 100 of this example, as is the case with the vehicles 10 of Examples 1 and 2, when the O/DHV mode and the U/DHV mode are switched during the EV running, the rotation speed synchronization control by the first rotating machine MG1 is performed after switching the release-switching engagement device to the released state and, subsequently, the engagement-switching engagement device is switched to the engaged state. Therefore, in the vehicle 100 of this example, the control operations of the electronic control device 80 described in Examples 1, 2 are applicable.

Figure 32:
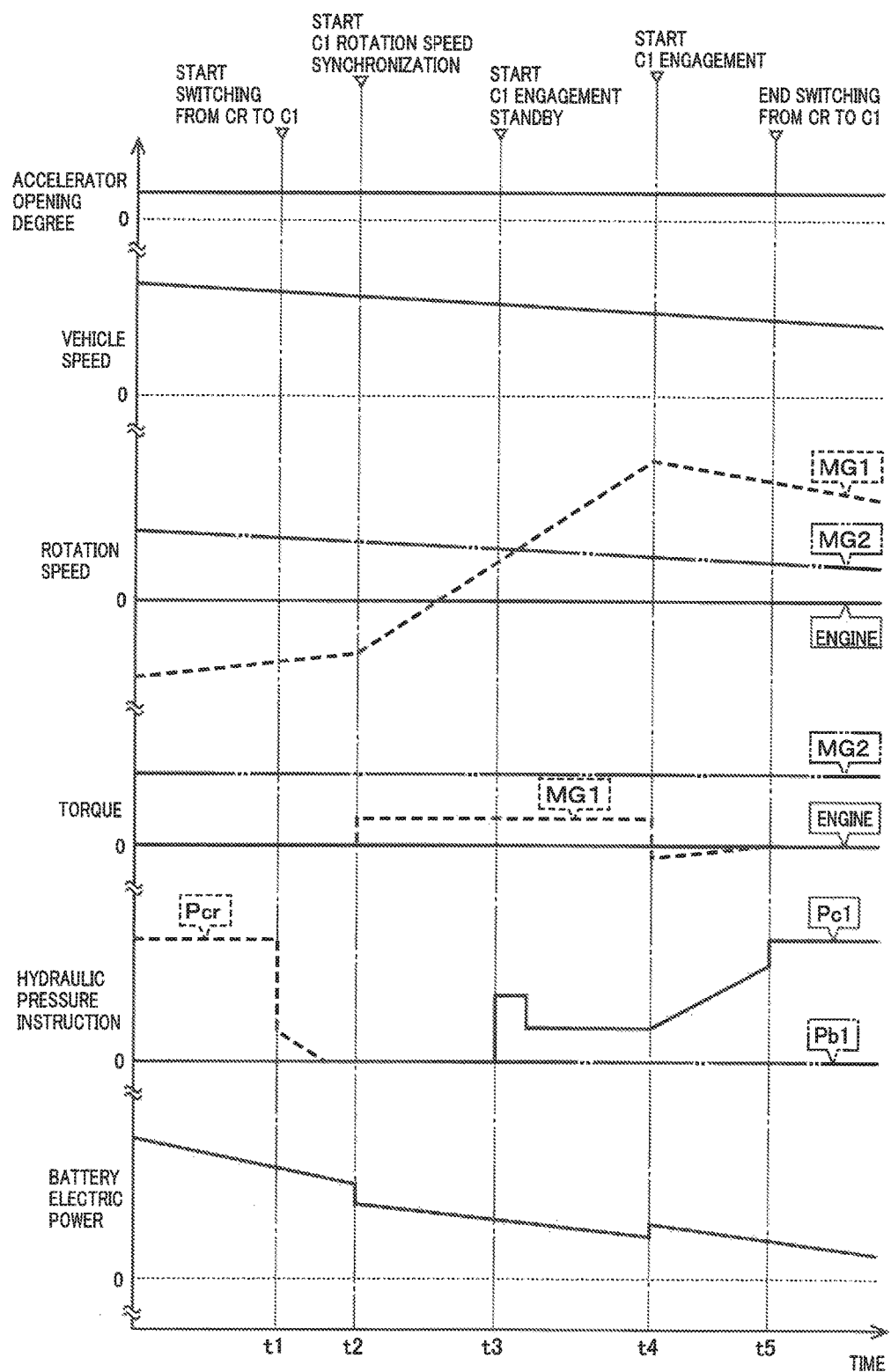
FIG. 32 is a diagram of an example of a time chart when the control operation shown in the flowchart of FIG. 17 is performed in the vehicle shown in FIG. 21.

FIG. 32 is a diagram of an example of a time chart when the control operation shown in the flowchart of FIG. 17 of Example 1 described above is performed in the vehicle 100 of this example. FIG. 32 shows a scene of switching from the O/DHV mode to the U/DHV mode during deceleration in the EV running while the power running is performed by the second rotating machine MG2 alone. This scene corresponds to deceleration when the accelerator opening degree θacc is low within the region indicated by the broken line of FIG. 14, for example.

In FIG. 32, because switching from the O/DHV mode to the U/DHV mode is determined in association with a reduction in the vehicle speed V, it is determined to start switching the engagement device put into the engaged state from the clutch CR to the clutch C1 (see time t1). In this way, the switching in this case occurs during the EV power running. Due to this determination, the hydraulic pressure value is lowered in the hydraulic pressure instruction for the clutch CR serving as the release-switching engagement device (see time t1 to time t2). Subsequently, when it is determined that the torque capacity of the clutch CR is sufficiently lowered, the synchronization of rotation speed is started in the clutch C1 serving as the engagement-switching engagement device (see time t2). The synchronization of rotation speed is performed through the control of the MG1 torque Tg (see time t2 to time t4). During the rotation speed synchronization control by the first rotating machine MG1, the standby control of the clutch C1 is started in time for completion of the rotation speed synchronization control (see time t3). When it is determined that the synchronization of the rotation speed in the clutch C1 is completed, the hydraulic pressure value of the hydraulic pressure instruction for the clutch C1 is increased, and the engagement of the clutch C1 is started so that the torque capacity of the clutch C1 is generated (see time t4). The rotation speed synchronization control by the first rotating machine MG1 is provided even during the transition while the torque capacity of the clutch C1 is increased (see time t4 to time t5). As a result, the engagement shock is further suppressed or the engagement shock is more reliably avoided. When the torque capacity of the clutch C1 is set to a sufficient value, the hydraulic pressure value of the hydraulic pressure instruction is set to the maximum hydraulic pressure, and the state transition for switching from the O/DHV mode to the U/DHV mode is terminated (see time t5).

As described above, according to this example, the same effects as Examples 1, 2 described above can be acquired.

Although the examples of the present invention have been described in detail with reference to the drawings, the present invention can be applied in other forms.

For example, in the examples described above, as shown in the flowchart of FIG. 17, the standby control of the engagement-switching engagement device is provided during the rotation speed synchronization control by the first rotating machine MG1, or the rotation speed synchronization control by the first rotating machine MG1 is provided even during transition of the engagement control of the engagement-switching engagement device; however, the present invention is not limited to this form. For example, the standby control or the rotation speed synchronization control during transition of the engagement control may not necessarily be provided. In such a form, S40, S60, and S80 in the flowchart of FIG. 17 are eliminated as appropriate.

In the examples described above, the first engagement device is the clutch C1 selectively coupling the fifth rotating element RE5 and the sixth rotating element RE6 in the first differential portion 44, and is the clutch C1 selectively coupling the fourth rotating element RE4 and the fifth rotating element RE5 in the first differential portion 106; however, the present invention is not limited to this form. For example, in the first differential portion 44, the first engagement device may be a clutch selectively coupling the fourth rotating element RE4 and the fifth rotating element RE5, or may be a clutch selectively coupling the fourth rotating element RE4 and the sixth rotating element RE6. In short, the first engagement device may be any clutch coupling any two rotating elements out of the fourth rotating element RE4, the fifth rotating element RE5, and the sixth rotating element RE6. Additionally, in the first differential portions 44, 106, the third engagement device is the clutch CR selectively coupling the third rotating element RE3 and the fifth rotating element RE5; however, the present invention is not limited to this form. For example, the third engagement device may be a clutch selectively coupling the second rotating element RE2 and the fifth rotating element RE5. Although the first differential portions 44, 106 include the single pinion type first planetary gear mechanism 48 and the single pinion type second planetary gear mechanism 50, the present invention is not limited to this form. For example, the first differential portion 44, 106 may include a double pinion type planetary gear mechanism instead of the single pinion type first planetary gear mechanism 48. Although the clutch C1, the brake B1, and the clutch CR are wet type hydraulic friction engagement devices, these portions may be engagement devices having the operating states switched by electric power.

In the examples described above, the vehicles 10, 100 include the clutch C1 and the brake B1; however, the present invention is applicable as long as at least one engagement device out of the clutch C1 and the brake B1 is included. Although the vehicles 10, 100 have gear trains with such a coupling relationship that the second rotating machine MG2 is disposed on an axis different from the axis of the first power transmission portions 24, 104, the gear train may be in such a coupling relationship that the second rotating machine MG2 is disposed on the same axis as the axis of the first power transmission portions 24, 104, for example. In short, the present invention is applicable to any vehicles including the engine 12, the first differential portions 44, 106, the second differential portions 46, 108, and the second rotating machine MG2 coupled to the drive wheels 16 in a power transmittable manner. Drive wheels W coupled to the second rotating machine MG2 in a power transmittable manner may not necessarily be the same as the drive wheels 16 coupled to the third rotating element of the first differential portions 44, 106 in a power transmittable manner. For example, one of the front wheels and the rear wheels may be the drive wheels 16 and the other may be the drive wheels W. In such a case, the drive wheels 16 and the drive wheels W are drive wheels, and both the third rotating element and the second rotating machine MG2 are coupled to the drive wheels in a power transmittable manner. Although the present invention has been described with the power transmission devices 14, 102 preferably used for the FF type vehicles 10, 100, the present invention can also be applied as appropriate to power transmission devices used for vehicles of other types such as an FR type and an RR type.

The above description is merely an embodiment and the present invention may be implemented in variously modified and improved forms based on the knowledge of those skilled in the art.

REFERENCE SIGNS LIST

10: Vehicle
12: Engine
16: Drive wheels
22: Case (Non-rotatable member)
44: First differential portion
CA1: First carrier (First rotating element)
S1: First sun gear (Second rotating element)

R1: First ring gear (Third rotating element)
46: Second differential portion
S2: Second sun gear (Fourth rotating element)
CA2: Second carrier (Fifth rotating element)
R2: Second ring gear (Sixth rotating element)
80: Electronic control device (Control device)
86: Start control portion
87: Engagement control portion
88: Differential rotation suppression control portion
100: Vehicle
106: First differential portion
R1: First ring gear (First rotating element)
S1: First sun gear (Second rotating element)
CA1: First carrier (Third rotating element)
108: Second differential portion
S2: Second sun gear (Fourth rotating element)
CA2: Second carrier (Fifth rotating element)
R2: Second ring gear (Sixth rotating element)
C1: Clutch (First engagement device)
B1: Brake (Second engagement device)
CR: Clutch (Third engagement device)
MG1: First rotating machine
MG2: Second rotating machine

What is claimed is:

1. A control device of a vehicle including a first differential portion, a second differential portion, and a second rotating machine, the first differential portion including a first rotating element, a second rotating element to which a first rotating machine is coupled in a power transmittable manner, and a third rotating element coupled to drive wheels, the first differential portion having a differential state controlled through control of the operational state of the first rotating machine, the second differential portion including a fourth rotating element to which an engine is coupled in a power transmittable manner, a fifth rotating element, and a sixth rotating element to which the first rotating element is coupled, the second rotating machine being coupled to the drive wheels in a power transmittable manner, the vehicle further including a plurality of engagement devices, which are at least one engagement device out of a first engagement device and a second engagement device, and a third engagement device, the first engagement device coupling any two rotating elements out of the fourth rotating element, the fifth rotating element, and the sixth rotating element, the second engagement device coupling the fifth rotating element to a non-rotatable member, the third engagement device coupling any one rotating element out of the second rotating element and the third rotating element to the fifth rotating element, the control device comprising:
an engagement control portion; and
a differential rotation suppression control portion,
during running of the vehicle in a rotation stop state of the engine, the engagement control portion is configured to put all of the plurality of engagement devices into the released state and, after a differential rotation speed is made equal to or less than a first predetermined value in an engagement-switching engagement device that is an engagement device to be put into the engaged state after switching, configured to put the engagement-switching engagement device into the engaged state, when either:

the engaged state of only the first engagement device or the engaged state of only the second engagement device is switched to the engaged state of only the third engagement device, or the engaged state of only the third engagement device is switched to the engaged state of only the first engagement device or the engaged state of only the second engagement device, the differential rotation suppression control portion is configured to control the operation of the first rotating machine so as to make the differential rotation speed equal to or less than the first predetermined value in the engagement-switching engagement device in the released state of all the engagement devices, and the differential rotation speed is a rotation speed difference between rotation speeds of rotating elements to which the engagement-switching engagement device couples each other.

2. The control device of a vehicle according to claim 1, further comprising a start control portion, when a start of the engine is requested during control of the first rotating machine by the differential rotation suppression control portion making the differential rotation speed equal to or less than the first predetermined value, initiating the start of the engine after completion of control of reducing the differential rotation speed by the differential rotation suppression control portion and control of putting the engagement-switching engagement device into the engaged state by the engagement control portion.

3. The control device of a vehicle according to claim 2, wherein when a start of the engine is requested during control of the first rotating machine by the differential rotation suppression control portion making the differential rotation speed equal to or less than the first predetermined value, the engagement control portion puts the engagement-switching engagement device into the engaged state after the differential rotation speed is made equal to or less than a second predetermined value higher than the first predetermined value.

4. The control device of a vehicle according to claim 1, wherein the differential rotation suppression control portion controls the operation of the first rotating machine so as to make the differential rotation speed equal to or less than the first predetermined value in the engagement-switching engagement device even during transition while the engagement-switching engagement device is put into the engaged state by the engagement control portion.

* * * * *